US008972984B2

(12) United States Patent
Meisner et al.

(10) Patent No.: US 8,972,984 B2
(45) Date of Patent: Mar. 3, 2015

(54) METHODS AND SYSTEMS FOR VIRTUALIZING AUDIO HARDWARE FOR ONE OR MORE VIRTUAL MACHINES

(75) Inventors: Steven Meisner, Bedford, MA (US); Jean Guyader, Cambridge (GB); Ian Pratt, Cambridge (GB)

(73) Assignee: Citrix Systems, Inc., Fort Lauderdale, FL (US)

( * ) Notice: Subject to any disclaimer, the term of this patent is extended or adjusted under 35 U.S.C. 154(b) by 288 days.

(21) Appl. No.: 13/475,055

(22) Filed: May 18, 2012

(65) Prior Publication Data
US 2012/0297383 A1 Nov. 22, 2012

Related U.S. Application Data

(60) Provisional application No. 61/488,405, filed on May 20, 2011.

(51) Int. Cl.
*G10L 21/04* (2013.01)
*G06F 9/455* (2006.01)
*G06F 3/16* (2006.01)

(52) U.S. Cl.
CPC ............ *G06F 9/45558* (2013.01); *G06F 3/165* (2013.01); *G06F 2009/45579* (2013.01)
USPC ............................... 718/1; 704/503; 719/324

(58) Field of Classification Search
None
See application file for complete search history.

(56) References Cited

U.S. PATENT DOCUMENTS

| 5,703,794 | A  | * | 12/1997 | Heddle et al. .................. 700/94 |
| 6,904,475 | B1 | * | 6/2005  | Fairman ......................... 710/52 |
| 7,743,389 | B2 | * | 6/2010  | Mahalingam et al. ........ 719/321 |
| 8,250,573 | B2 | * | 8/2012  | Singhal et al. .................... 718/1 |
| 2003/0182001 | A1 | * | 9/2003 | Radenkovic et al. ............ 700/94 |
| 2006/0069828 | A1 | * | 3/2006 | Goldsmith .................... 710/100 |
| 2007/0079308 | A1 | * | 4/2007 | Chiaramonte et al. ............ 718/1 |
| 2009/0119684 | A1 | * | 5/2009 | Mahalingam et al. ........ 719/324 |
| 2009/0171677 | A1 | * | 7/2009 | Singhal et al. ................ 704/503 |

FOREIGN PATENT DOCUMENTS

WO    WO 2006130931 A1 * 12/2006

* cited by examiner

*Primary Examiner* — Abdullah Al Kawsar
*Assistant Examiner* — Dar-Eaum Nam
(74) *Attorney, Agent, or Firm* — Foley and Lardner LLP; John D. Lanza

(57) ABSTRACT

The present disclosure is directed towards methods and systems for virtualizing audio hardware for one or more virtual machines. A control virtual machine (VM) may translate a first stream of audio functions calls from a first VM hosted by a hypervisor. The translated first stream of audio function calls may be destined for a sound card of the computing device executing the hypervisor. The control VM may detect a second stream of audio functions calls from a second VM hosted by the hypervisor. The control VM may translate the second stream of audio functions calls from the second VM. The control VM may further merge the translated first stream of audio function calls and the translated second stream of the audio function calls in response to the detected second stream. The control VM may transmit the merged stream of audio function calls to the sound card.

18 Claims, 8 Drawing Sheets

METHODS AND SYSTEMS FOR VIRTUALIZING AUDIO HARDWARE FOR ONE OR MORE VIRTUAL MACHINES

RELATED APPLICATION

The present application claims the benefit of and priority to U.S. Provisional Patent Application No. 61/488,405, entitled "METHODS AND SYSTEMS FOR VIRTUALIZING AUDIO HARDWARE FOR ONE OR MORE VIRTUAL MACHINES", filed May 20, 2011, which is incorporated herein by reference in its entirety for all purposes.

FIELD OF THE DISCLOSURE

The methods and systems described herein relate generally to managing resources to virtual machines. In particular, the methods and systems relate to virtualizing audio hardware for virtual machines.

BACKGROUND OF THE DISCLOSURE

In virtualization environments, a hypervisor may map various hardware on a host machine to a virtual machine. Unlike other hardware resources, such as multi-core processors and disk storage which can be partitioned, audio hardware such as a sound card may not be easily partitioned. In a multi-virtual-machine environment, the hypervisor may allow only one virtual machine to access a sound card at a time, in order to avoid conflicts in processing concurrent audio instructions, or multiple audio streams to overload the sound card. However, a rigid assignment of a sound card to one virtual machine may impair user experience across other virtual machines, such as where a user may rely on audio cues from background virtual machines, or may desire access to audio playback from multiple virtual machines.

BRIEF SUMMARY OF THE DISCLOSURE

Described herein are methods and systems for virtualizing audio hardware for virtual machines. The present systems and methods recognize that host resources, such as audio hardware, may be limited, and provides the ability for such resources to be managed and allocated efficiently across one or more virtual machines. The systems and methods may intercept and process independent streams of audio information originating from different virtual machines, and may employ mixing techniques to provide these audio streams equal or weighted access to a sound card for processing. In some aspects, the present systems and methods may accord better audio processing to one virtual machine over another. For example, a control virtual machine may allocate more resources (e.g., audio hardware processing) to a first virtual machine, as compared to other virtual machines. The systems and methods described herein may further assign or re-allocate a limited resource, in whole or in part, from one virtual machine to another virtual machine where required. In some embodiments, a sound card emulation program may be seamlessly assigned to handle audio processing for a virtual machine in place of a sound card.

In one aspect, the present disclosure is related to a method for virtualizing audio hardware for at least one virtual machine. The method may include storing, by a control virtual machine hosted by a hypervisor executing on a computing device, state information of a sound card of the computing device. The sound card may process audio function calls from a first virtual machine. The control virtual machine may configure a sound card emulation program with at least a portion of the state information. The control virtual machine may redirect the first virtual machine from the sound card to the sound card emulation program. The sound card emulation program may receive additional audio function calls from the first virtual machine.

In some embodiments, the control virtual machine determines that a second virtual machine requires access to the sound card. The control virtual machine may assign the sound card to a second virtual machine. The control virtual machine may determine that the first virtual machine has a priority to the sound card lower than that of a second virtual machine. The control virtual machine may configure a virtual audio driver with the at least a portion of the state information.

In certain embodiments, the control virtual machine may redirect the first virtual machine from the sound card to the sound card emulation program without triggering an interrupt or error from an operating system of the first virtual machine. The control virtual machine may redirect the first virtual machine from the sound card to the sound card emulation program without the first virtual machine detecting a removal of the sound card. The control virtual machine may intercept the additional audio function calls from the first virtual machine. The control virtual machine may replace the sound card with the sound card emulation program in a device mapping of the first virtual machine. The control virtual machine may replace the first virtual machine from the sound card emulation program to the sound card.

In another aspect, the present disclosure is related to a method for virtualizing audio hardware for at least one virtual machine. The method may include translating, by a control virtual machine hosted by a hypervisor executing on a computing device, a first stream of audio function calls from a first virtual machine hosted by the hypervisor, the translated first stream of audio function calls destined for a sound card of the computing device. The control virtual machine may detect a second stream of audio function calls from a second virtual machine hosted by the hypervisor. The control virtual machine may translate the second stream of audio function calls from the second virtual machine. The control virtual machine may, in response to the detected second stream of audio function calls, merge the translated first stream of audio function calls and the translated second stream of the audio function calls. The control virtual machine may transmit the merged stream of audio function calls to the sound card.

In some embodiments, the control virtual machine merges the translated first stream of audio function calls and the translated second stream of the audio function calls in a first-in-first-out (FIFO) fashion. The control virtual machine may merge the translated first stream of audio function calls and the translated second stream of the audio function calls. The control virtual machine may combine two or more of the audio function calls from the first and second streams into one audio function call. The control virtual machine may delay or advance at least one audio function call from the first or second stream, in the merged stream.

In certain embodiments, the control virtual machine may detect a third stream of audio function calls from a third virtual machine hosted by the hypervisor, and translating the third stream of audio function calls from the third virtual machine. The control virtual machine may determine that the first stream of audio function calls has a higher priority than one or both of the second and third streams of audio function calls. The control virtual machine may merge the translated versions of the second and third streams of audio function calls into a fourth stream of audio function calls, and merging the translated first stream of audio function calls with the fourth stream of audio function calls into a fifth stream of audio function calls. The control virtual machine may provide the translated first stream with at least the same bandwidth or processing quality as the fourth stream of audio function calls. In some embodiments, the control virtual machine sends the translated third stream of audio function calls to one of: an emulation program and a second sound card, to generate a first audio output. An audio driver may mixing the first audio output and an audio output of the sound card, for audio rendering.

In yet another aspect, the present disclosure is related to a method and system for virtualizing audio hardware for one or more virtual machines. A control virtual machine hosted by a hypervisor executing on a computing device may translate a first stream of audio functions calls from a first virtual machine hosted by the hypervisor. The translated first stream of audio function calls may be destined for a sound card of the computing device. The control virtual machine may detect a second stream of audio functions calls from a second virtual machine hosted by the hypervisor and a third stream of audio functions calls from a third virtual machine hosted by the hypervisor. The control virtual machine may merge, in response to the detection, translated versions of the second and third streams of audio function calls into a fourth stream of audio function calls. The control virtual machine may merge the translated first streams of audio function calls with the fourth stream of audio function calls into a fifth stream of audio function calls. The control virtual machine may transmit the fifth stream of audio function calls to the sound card.

The details of various embodiments of the invention are set forth in the accompanying drawings and the description below.

BRIEF DESCRIPTION OF THE FIGURES

The foregoing and other objects, aspects, features, and advantages of the disclosure will become more apparent and better understood by referring to the following description taken in conjunction with the accompanying drawings, in which.

Figure 1A:
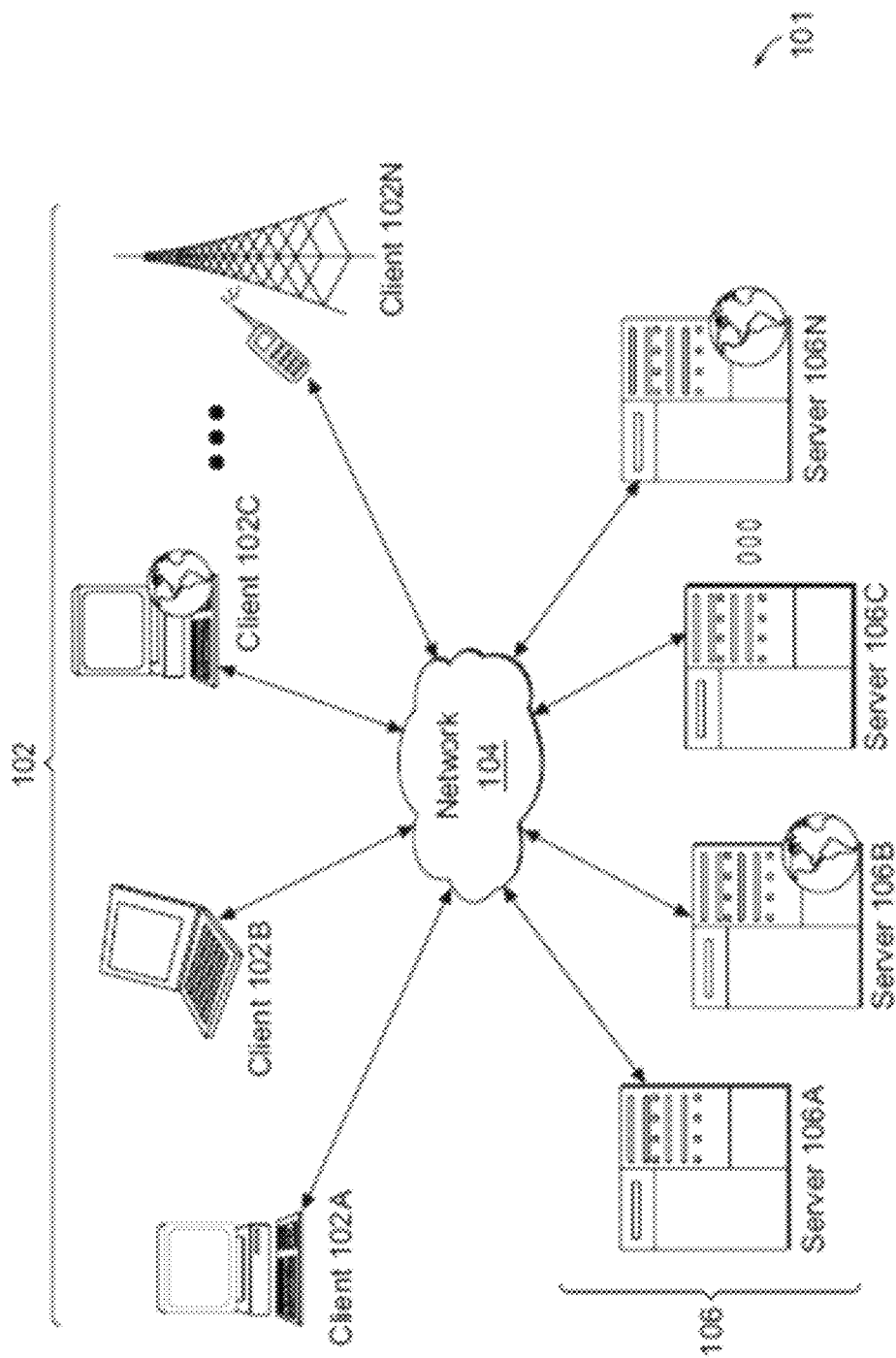
FIG. 1A is a block diagram depicting an embodiment of a network environment comprising local machines in communication with remote machines.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION OF THE INVENTION

For purposes of reading the description of the various embodiments below, the following descriptions of the sections of the specification and their respective contents may be helpful:

Section A describes a network environment and computing environment which may be useful for practicing embodiments described herein;

Section B describes embodiments of systems including a virtualization environment which may be useful for practicing embodiments described herein; and Section C describes embodiments of systems and methods for virtualizing audio hardware for virtual machines.

A. Network and Computing Environment

Referring now to FIG. 1A, an embodiment of a network environment is depicted. In brief overview, the network environment comprises one or more local machines 102a-102n (also generally referred to as local machine(s) 102, client(s) 102, client node(s) 102, client machine(s) 102, client computer(s) 102, client device(s) 102, endpoint(s) 102, or endpoint node(s) 102) in communication with one or more remote machines 106a-106n (also generally referred to as server(s) 106 or remote machine(s) 106) via one or more networks 104. In some embodiments, a local machine 102 has the capacity to function as both a client node seeking access to resources provided by a server and as a server providing access to hosted resources for other clients 102a-102n.

Although FIG. 1A shows a network 104 between the local machines 102 and the remote machines 106, the local machines 102 and the remote machines 106 may be on the same network 104. The network 104 can be a local-area network (LAN), such as a company Intranet, a metropolitan area network (MAN), or a wide area network (WAN), such as the Internet or the World Wide Web. In some embodiments, there are multiple networks 104 between the local machines 102 and the remote machines 106. In one of these embodiments, a network 104' (not shown) may be a private network and a network 104 may be a public network. In another of these embodiments, a network 104 may be a private network and a network 104' a public network. In still another embodiment, networks 104 and 104' may both be private networks. In yet another embodiment, networks 104 and 104' may both be public networks.

The network 104 may be any type and/or form of network and may include any of the following: a point to point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network 104 may comprise a wireless link, such as an infrared channel or satellite band. The topology of the network 104 may be a bus, star, or ring network topology. The network 104 may be of any such network topology as known to those ordinarily skilled in the art capable of supporting the operations described herein. The network may comprise mobile telephone networks utilizing any protocol or protocols used to communicate among mobile devices, including AMPS, TDMA, CDMA, GSM, GPRS or UMTS. In some embodiments, different types of data may be transmitted via different protocols. In other embodiments, the same types of data may be transmitted via different protocols.

In some embodiments, the system may include multiple, logically-grouped remote machines 106. In one of these embodiments, the logical group of remote machines may be referred to as a server farm. In another of these embodiments, the remote machines 106 may be geographically dispersed. In other embodiments, a server farm may be administered as a single entity. In still other embodiments, the server farm comprises a plurality of server farms. The remote machines 106 within each server farm can be heterogeneous—one or more of the remote machines 106 can operate according to one type of operating system platform (e.g., WINDOWS NT, WINDOWS 2003, WINDOWS 2008, WINDOWS 7 and WINDOWS Server 2008 R2, all of which are manufactured by Microsoft Corp. of Redmond, Wash.), while one or more of the other remote machines 106 can operate on according to another type of operating system platform (e.g., Unix or Linux).

The remote machines 106 of each server farm do not need to be physically proximate to another remote machine 106 in the same server farm. Thus, the group of remote machines 106 logically grouped as a server farm may be interconnected using a wide-area network (WAN) connection or a metropolitan-area network (MAN) connection. For example, a server farm 38 may include remote machines 106 physically located in different continents or different regions of a continent, country, state, city, campus, or room. Data transmission speeds between remote machines 106 in the server farm can be increased if the remote machines 106 are connected using a local-area network (LAN) connection or some form of direct connection.

A remote machine 106 may be a file server, application server, web server, proxy server, appliance, network appliance, gateway, application gateway, gateway server, virtualization server, deployment server, SSL VPN server, or firewall. In some embodiments, a remote machine 106 provides a remote authentication dial-in user service, and is referred to as a RADIUS server. In other embodiments, a remote machine 106 may have the capacity to function as either an application server or as a master application server. In still other embodiments, a remote machine 106 is a blade server. In yet other embodiments, a remote machine 106 executes a virtual machine providing, to a user or client computer 102, access to a computing environment.

In one embodiment, a remote machine 106 may include an Active Directory. The remote machine 106 may be an application acceleration appliance. For embodiments in which the remote machine 106 is an application acceleration appliance, the remote machine 106 may provide functionality including firewall functionality, application firewall functionality, or load balancing functionality. In some embodiments, the remote machine 106 comprises an appliance such as one of the line of appliances manufactured by the Citrix Application Networking Group, of San Jose, Calif., or Silver Peak Systems, Inc., of Mountain View, Calif., or of Riverbed Technology, Inc., of San Francisco, Calif., or of F5 Networks, Inc., of Seattle, Wash., or of Juniper Networks, Inc., of Sunnyvale, Calif.

In some embodiments, a remote machine 106 executes an application on behalf of a user of a local machine 102. In other embodiments, a remote machine 106 executes a virtual machine, which provides an execution session within which applications execute on behalf of a user of a local machine 102. In one of these embodiments, the execution session is a hosted desktop session. In another of these embodiments, the execution session provides access to a computing environment, which may comprise one or more of: an application, a plurality of applications, a desktop application, and a desktop session in which one or more applications may execute.

In some embodiments, a local machine 102 communicates with a remote machine 106. In one embodiment, the local machine 102 communicates directly with one of the remote machines 106 in a server farm 38. In another embodiment, the local machine 102 executes a program neighborhood application to communicate with a remote machine 106 in a server farm 38. In still another embodiment, the remote machine 106 provides the functionality of a master node. In some embodiments, the local machine 102 communicates with the remote machine 106 in the server farm 38 through a network 104. Over the network 104, the local machine 102 can, for example, request execution of various applications hosted by the remote machines 106a-106n in the server farm 38 and receive output of the results of the application execution for display. In some embodiments, only a master node provides the functionality required to identify and provide address information associated with a remote machine 106b hosting a requested application.

In one embodiment, the remote machine 106 provides the functionality of a web server. In another embodiment, the remote machine 106a receives requests from the local machine 102, forwards the requests to a second remote machine 106b and responds to the request by the local machine 102 with a response to the request from the remote machine 106b. In still another embodiment, the remote machine 106a acquires an enumeration of applications available to the local machine 102 and address information associated with a remote machine 106b hosting an application identified by the enumeration of applications. In yet another embodiment, the remote machine 106 presents the response to the request to the local machine 102 using a web interface. In one embodiment, the local machine 102 communicates directly with the remote machine 106 to access the identified application. In another embodiment, the local machine 102 receives output data, such as display data, generated by an execution of the identified application on the remote machine 106.

In some embodiments, the remote machine 106 or a server farm 38 may be running one or more applications, such as an application providing a thin-client computing or remote display presentation application. In one embodiment, the remote machine 106 or server farm 38 executes as an application any portion of the CITRIX ACCESS SUITE by Citrix Systems, Inc., such as the METAFRAME or CITRIX PRESENTATION SERVER products, any of the following products manufactured by Citrix Systems, Inc.: CITRIX XENAPP, CITRIX XENDESKTOP, CITRIX ACCESS GATEWAY, and/or any of the MICROSOFT WINDOWS Terminal Services manufactured by the Microsoft Corporation. In another embodiment, the application is an ICA client, developed by Citrix Systems, Inc. of Fort Lauderdale, Fla. In still another embodiment, the remote machine 106 may run an application, which, for example, may be an application server providing email services such as MICROSOFT EXCHANGE manufactured by the Microsoft Corporation of Redmond, Wash., a web or Internet server, or a desktop sharing server, or a collaboration server. In yet another embodiment, any of the applications may comprise any type of hosted service or products, such as GOTOMEETING provided by Citrix Online Division, Inc. of Santa Barbara, Calif., WEBEX provided by WebEx, Inc. of Santa Clara, Calif., or Microsoft Office LIVE MEETING provided by Microsoft Corporation of Redmond, Wash.

A local machine 102 may execute, operate or otherwise provide an application, which can be any type and/or form of software, program, or executable instructions such as any type and/or form of web browser, web-based client, client-server application, a thin-client computing client, an ActiveX control, or a Java applet, or any other type and/or form of executable instructions capable of executing on local machine 102. In some embodiments, the application may be a server-based or a remote-based application executed on behalf of the local machine 102 on a remote machine 106. In other embodiments, the remote machine 106 may display output to the local machine 102 using any thin-client protocol, presentation layer protocol, or remote-display protocol, such as the Independent Computing Architecture (ICA) protocol manufactured by Citrix Systems, Inc. of Ft. Lauderdale, Fla.; the Remote Desktop Protocol (RDP) manufactured by the Microsoft Corporation of Redmond, Wash.; the X11 protocol; the Virtual Network Computing (VNC) protocol, manufactured by AT&T Bell Labs; the SPICE protocol, manufactured by Qumranet, Inc., of Sunnyvale, Calif., USA, and of Raanana, Israel; the Net2Display protocol, manufactured by VESA, of Milpitas, Calif.; the PC-over-IP protocol, manufactured by Teradici Corporation, of Burnaby, B. C.; the TCX protocol, manufactured by Wyse Technology, Inc., of San Jose, Calif.; the THINC protocol developed by Columbia University in the City of New York, of New York, N.Y.; or the Virtual-D protocols manufactured by Desktone, Inc., of Chelmsford, Mass. The application can use any type of protocol and it can be, for example, an HTTP client, an FTP client, an Oscar client, or a Telnet client. In still other embodiments, the application comprises any type of software related to voice over Internet protocol (VoIP) communications, such as a soft IP telephone. In further embodiments, the application comprises any application related to real-time data communications, such as applications for streaming video and/or audio.

Figure 1B:
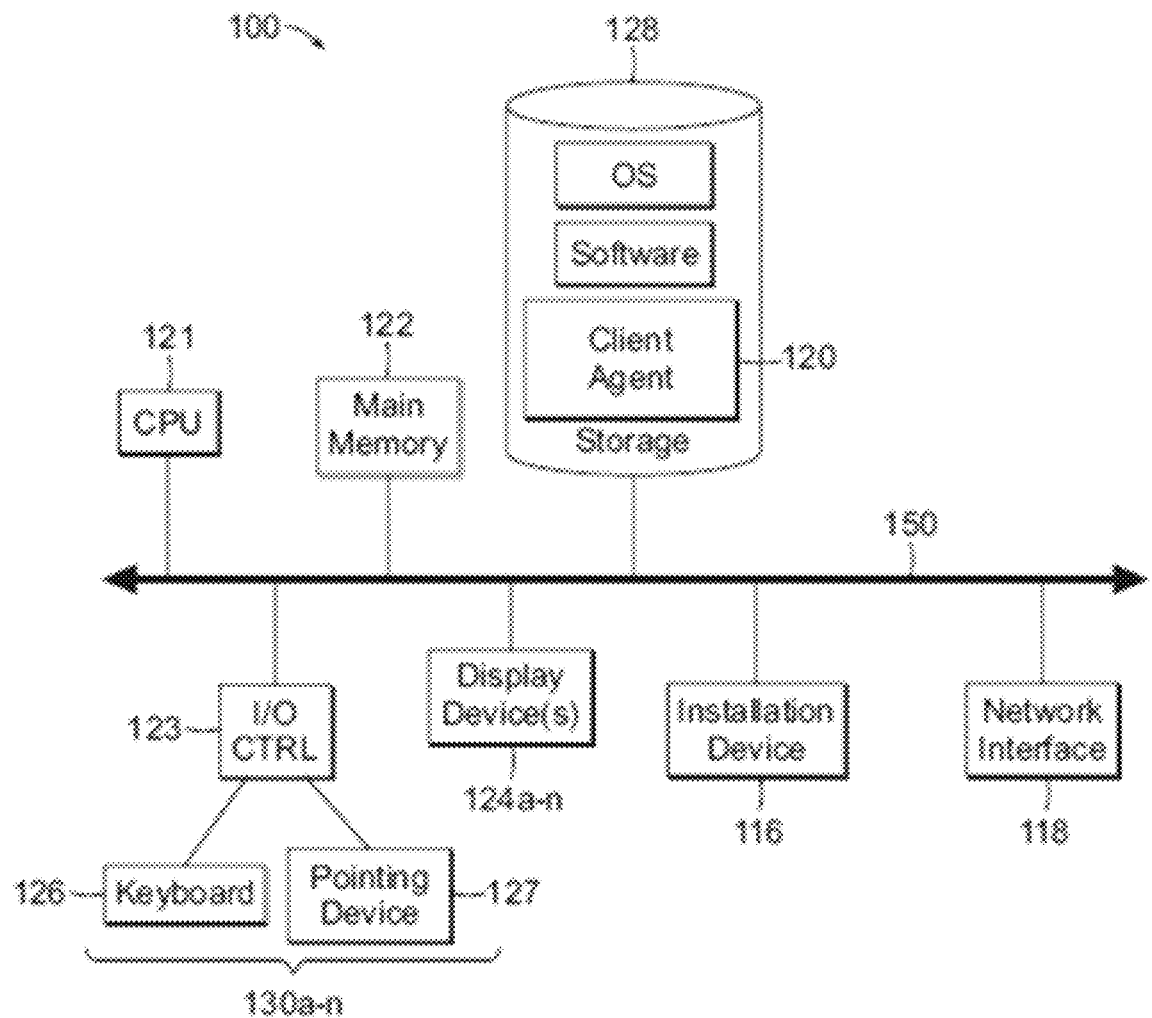
FIGS. 1B-1C are block diagrams depicting embodiments of computers useful in connection with the methods and systems described herein.
Figure 1C:
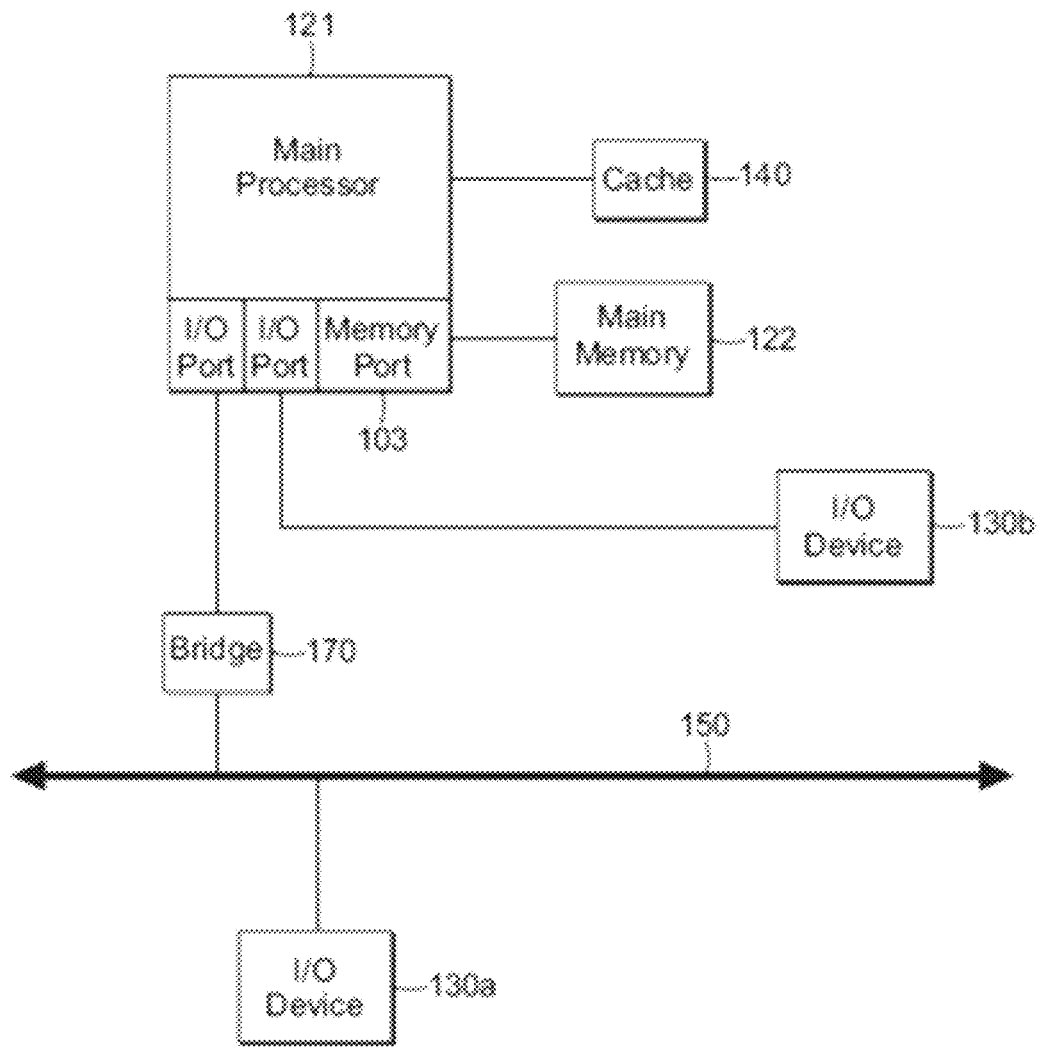

The local machine 102 and remote machine 106 may be deployed as and/or executed on any type and form of computing device, such as a computer, network device or appliance capable of communicating on any type and form of network and performing the operations described herein. FIGS. 1B and 1C depict block diagrams of a computing device 100 useful for practicing an embodiment of the local machine 102 or a remote machine 106. As shown in FIGS. 1B and 1C, each computing device 100 includes a central processing unit 121, and a main memory unit 122. As shown in FIG. 1B, a computing device 100 may include a storage device 128, an installation device 116, a network interface 118, an I/O controller 123, display devices 124a-n, a keyboard 126 and a pointing device 127, such as a mouse. The storage device 128 may include, without limitation, an operating system, software, and a client agent 120. As shown in FIG. 1C, each computing device 100 may also include additional optional elements, such as a memory port 103, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; the RS/6000 processor, those manufactured by International Business Machines of White Plains, N.Y.; or those manufactured by Advanced Micro Devices of Sunnyvale, Calif. The computing device 100 may be based on any of these processors, or any other processor capable of operating as described herein.

Main memory unit 122 may be one or more memory chips capable of storing data and allowing any storage location to be directly accessed by the microprocessor 121, such as Static random access memory (SRAM), Burst SRAM or Synch-Burst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC 100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). The main memory 122 may be based on any of the above described memory chips, or any other available memory chips capable of operating as described herein. In the embodiment shown in FIG. 1B, the processor 121 communicates with main memory 122 via a system bus 150 (described in more detail below). FIG. 1C depicts an embodiment of a computing device 100 in which the processor communicates directly with main memory 122 via a memory port 103. For example, in FIG. 1C the main memory 122 may be DRDRAM.

FIG. 1C depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1B, the processor 121 communicates with various I/O devices 130 via a local system bus 150. Various buses may be used to connect the central processing unit 121 to any of the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 121 may use an Advanced Graphics Port (AGP) to communicate with the display 124. FIG. 1C depicts an embodiment of a computer 100 in which the main processor 121 communicates directly with I/O device 130b via HYPERTRANSPORT, RAPIDIO, or INFINIBAND communications technology. FIG. 1C also depicts an embodiment in which local busses and direct communication are mixed: the processor 121 communicates with I/O device 130a using a local interconnect bus while communicating with I/O device 130b directly.

A wide variety of I/O devices 130a-130n may be present in the computing device 100. Input devices include keyboards, mice, trackpads, trackballs, microphones, and drawing tablets. Output devices include video displays, speakers, inkjet printers, laser printers, and dye-sublimation printers. An I/O controller 123, as shown in FIG. 1B, may control the I/O devices. The I/O controller may control one or more I/O devices such as a keyboard 126 and a pointing device 127, e.g., a mouse or optical pen. Furthermore, an I/O device may also provide storage and/or an installation medium 116 for the computing device 100. In still other embodiments, the computing device 100 may provide USB connections (not shown) to receive handheld USB storage devices such as the USB Flash Drive line of devices manufactured by Twintech Industry, Inc. of Los Alamitos, Calif.

Referring again to FIG. 1B, the computing device 100 may support any suitable installation device 116, such as a floppy disk drive for receiving floppy disks such as 3.5-inch, 5.25-inch disks or ZIP disks, a CD-ROM drive, a CD-R/RW drive, a DVD-ROM drive, tape drives of various formats, USB device, hard-drive or any other device suitable for installing software and programs. The computing device 100 may further comprise a storage device, such as one or more hard disk drives or redundant arrays of independent disks, for storing an operating system and other related software, and for storing application software programs such as any program related to the client agent 120. Optionally, any of the installation devices 116 could also be used as the storage device. Additionally, the operating system and the software can be run from a bootable medium, for example, a bootable CD, such as KNOPPIX, a bootable CD for GNU/Linux that is available as a GNU/Linux distribution from knoppix.net.

Furthermore, the computing device 100 may include a network interface 118 to interface to the network 104 through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, CDMA, GSM, WiMax and direct asynchronous connections). In one embodiment, the computing device 100 communicates with other computing devices 100' via any type and/or form of gateway or tunneling protocol such as Secure Socket Layer (SSL) or Transport Layer Security (TLS), or the Citrix Gateway Protocol manufactured by Citrix Systems, Inc. of Ft. Lauderdale, Fla. The network interface 118 may comprise a built-in network adapter, network interface card, PCMCIA network card, card bus network adapter, wireless network adapter, USB network adapter, modem or any other device suitable for interfacing the computing device 100 to any type of network capable of communication and performing the operations described herein.

In some embodiments, the computing device 100 may comprise or be connected to multiple display devices 124a-124n, which each may be of the same or different type and/or form. As such, any of the I/O devices 130a-130n and/or the I/O controller 123 may comprise any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may comprise multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices, such as computing devices 100a and 100b connected to the computing device 100, for example, via a network. These embodiments may include any type of software designed and constructed to use another computer's display device as a second display device 124a for the computing device 100. One ordinarily skilled in the art will recognize and appreciate the various ways and embodiments that a computing device 100 may be configured to have multiple display devices 124a-124n.

In further embodiments, an I/O device 130 may be a bridge between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a Fibre-Channel bus, or a Serial Attached small computer system interface bus.

A computing device 100 of the sort depicted in FIGS. 1B and 1C typically operates under the control of operating systems, which control scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 3.x, WINDOWS 95, WINDOWS 98, WINDOWS 2000, WINDOWS NT 3.51, WINDOWS NT 4.0, WINDOWS 7, WINDOWS CE, WINDOWS XP, and WINDOWS VISTA, all of which are manufactured by Microsoft Corporation of Redmond, Wash.; MAC OS, manufactured by Apple Inc., of Cupertino, Calif.; OS/2, manufactured by International Business Machines of Armonk, N.Y.; and Linux, a freely-available operating system distributed by Caldera Corp. of Salt Lake City, Utah, or any type and/or form of a Unix operating system, among others.

The computing device 100 can be any workstation, desktop computer, laptop or notebook computer, server, handheld computer, mobile telephone or other portable telecommunication device, media playing device, a gaming system, mobile computing device, or any other type and/or form of computing, telecommunications or media device that is capable of communication and that has sufficient processor power and memory capacity to perform the operations described herein. For example, the computing device 100 may comprise a device of the IPOD family of devices manufactured by Apple Inc., of Cupertino, Calif., a PLAYSTATION 2, PLAYSTATION 3, or PERSONAL PLAYSTATION PORTABLE (PSP) device manufactured by the Sony Corporation of Tokyo, Japan, a NINTENDO DS, NINTENDO GAMEBOY, NINTENDO GAMEBOY ADVANCED or NINTENDO REVOLUTION device manufactured by Nintendo Co., Ltd., of Kyoto, Japan, or an XBOX or XBOX 360 device manufactured by the Microsoft Corporation of Redmond, Wash.

In some embodiments, the computing device 100 may have different processors, operating systems, and input devices consistent with the device. For example, in one embodiment, the computing device 100 is a TREO 180, 270, 600, 650, 680, 700p, 700w/wx, 750, 755p, 800w, Centro, or Pro smart phone manufactured by Palm, Inc. In some of these embodiments, the TREO smart phone is operated under the control of the PalmOS operating system and includes a stylus input device as well as a five-way navigator device.

In other embodiments the computing device 100 is a mobile device, such as a JAVA-enabled cellular telephone or personal digital assistant (PDA), such as the i55sr, i58sr, i85s, i88s, i90c, i95cl, i335, i365, i570, I576, i580, i615, i760, i836, i850, i870, i880, i920, i930, ic502, ic602, ic902, i776 or the im1100, all of which are manufactured by Motorola Corp. of Schaumburg, Ill., the 6035 or the 7135, manufactured by Kyocera of Kyoto, Japan, or the i300 or i330, manufactured by Samsung Electronics Co., Ltd., of Seoul, Korea. In some embodiments, the computing device 100 is a mobile device manufactured by Nokia of Finland, or by Sony Ericsson Mobile Communications AB of Lund, Sweden.

In still other embodiments, the computing device 100 is a Blackberry handheld or smart phone, such as the devices manufactured by Research In Motion Limited, including the Blackberry 7100 series, 8700 series, 7700 series, 7200 series, the Blackberry 7520, the Blackberry PEARL 8100, the 8700 series, the 8800 series, the Blackberry Storm, Blackberry Bold, Blackberry Curve 8900, and the Blackberry Pearl Flip. In yet other embodiments, the computing device 100 is a smart phone, Pocket PC, Pocket PC Phone, or other handheld mobile device supporting Microsoft Windows Mobile Software. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

In some embodiments, the computing device 100 is a digital audio player. In one of these embodiments, the computing device 100 is a digital audio player such as the Apple IPOD, IPOD Touch, IPOD NANO, and IPOD SHUFFLE lines of devices, manufactured by Apple Inc., of Cupertino, Calif. In another of these embodiments, the digital audio player may function as both a portable media player and as a mass storage device. In other embodiments, the computing device 100 is a digital audio player such as the DigitalAudioPlayer Select MP3 players, manufactured by Samsung Electronics America, of Ridgefield Park, N.J., or the Motorola m500 or m25 Digital Audio Players, manufactured by Motorola Inc. of Schaumburg, Ill. In still other embodiments, the computing device 100 is a portable media player, such as the Zen Vision W, the Zen Vision series, the Zen Portable Media Center devices, or the Digital MP3 line of MP3 players, manufactured by Creative Technologies Ltd. In yet other embodiments, the computing device 100 is a portable media player or digital audio player supporting file formats including, but not limited to, MP3, WAV, M4A/AAC, WMA Protected AAC, RIFF, Audible audiobook, Apple Lossless audio file formats and .mov, .m4v, and .mp4 MPEG-4 (H.264/MPEG-4 AVC) video file formats.

In some embodiments, the computing device 100 comprises a combination of devices, such as a mobile phone combined with a digital audio player or portable media player. In one of these embodiments, the computing device 100 is a Motorola RAZR or Motorola ROKR line of combination digital audio players and mobile phones. In another of these embodiments, the computing device 100 is a device in the iPhone line of smartphones, manufactured by Apple Inc., of Cupertino, Calif.

In one embodiment, a computing device 102a may request resources from a remote machine 106, while providing the functionality of a remote machine 106 to a client 102b. In such an embodiment, the computing device 102a may be referred to as a client with respect to data received from the remote machine 106 (which may be referred to as a server) and the computing device 102a may be referred to as a server with respect to the second client 102b. In another embodiment, the client 102 may request resources from the remote machine 106 on behalf of a user of the client 102.

As shown in FIG. 1D, the computing device 100 may comprise multiple processors and may provide functionality for simultaneous execution of instructions or for simultaneous execution of one instruction on more than one piece of data. In some embodiments, the computing device 100 may comprise a parallel processor with one or more cores. In one of these embodiments, the computing device 100 is a shared memory parallel device, with multiple processors and/or multiple processor cores, accessing all available memory as a single global address space. In another of these embodiments, the computing device 100 is a distributed memory parallel device with multiple processors each accessing local memory only. In still another of these embodiments, the computing device 100 has both some memory which is shared and some memory which can only be accessed by particular processors or subsets of processors. In still even another of these embodiments, the computing device 100, such as a multicore microprocessor, combines two or more independent processors into a single package, often a single integrated circuit (IC). In yet another of these embodiments, the computing device 100 includes a chip having a CELL BROADBAND ENGINE architecture and including a Power processor element and a plurality of synergistic processing elements, the Power processor element and the plurality of synergistic processing elements linked together by an internal high speed bus, which may be referred to as an element interconnect bus.

In some embodiments, the processors provide functionality for execution of a single instruction simultaneously on multiple pieces of data (SIMD). In other embodiments, the processors provide functionality for execution of multiple instructions simultaneously on multiple pieces of data (MIMD). In still other embodiments, the processor may use any combination of SIMD and MIMD cores in a single device.

In some embodiments, the computing device 100 may comprise a graphics processing unit. In one of these embodiments, depicted in FIG. 1E, the computing device 100 includes at least one central processing unit 121 and at least one graphics processing unit. In another of these embodiments, the computing device 100 includes at least one parallel processing unit and at least one graphics processing unit. In still another of these embodiments, the computing device 100 includes a plurality of processing units of any type, one of the plurality of processing units comprising a graphics processing unit.

In one embodiment, a resource may be a program, an application, a document, a file, a plurality of applications, a plurality of files, an executable program file, a desktop environment, a computing environment, or other resource made available to a user of the local computing device 102. The resource may be delivered to the local computing device 102 via a plurality of access methods including, but not limited to, conventional installation directly on the local computing device 102, delivery to the local computing device 102 via a method for application streaming, delivery to the local computing device 102 of output data generated by an execution of the resource on a third computing device 106b and communicated to the local computing device 102 via a presentation layer protocol, delivery to the local computing device 102 of output data generated by an execution of the resource via a virtual machine executing on a remote computing device 106, or execution from a removable storage device connected to the local computing device 102, such as a USB device, or via a virtual machine executing on the local computing device 102 and generating output data. In some embodiments, the local computing device 102 transmits output data generated by the execution of the resource to another client computing device 102b.

In some embodiments, a user of a local computing device 102 connects to a remote computing device 106 and views a display on the local computing device 102 of a local version of a remote desktop environment, comprising a plurality of data objects, generated on the remote computing device 106. In one of these embodiments, at least one resource is provided to the user by the remote computing device 106 (or by a second remote computing device 106b) and displayed in the remote desktop environment. However, there may be resources that the user executes on the local computing device 102, either by choice, or due to a policy or technological requirement. In another of these embodiments, the user of the local computing device 102 would prefer an integrated desktop environment providing access to all of the resources available to the user, instead of separate desktop environments for resources provided by separate machines. For example, a user may find navigating between multiple graphical displays confusing and difficult to use productively. Or, a user may wish to use the data generated by one application provided by one machine in conjunction with another resource provided by a different machine. In still another of these embodiments, requests for execution of a resource, windowing moves, application minimize/maximize, resizing windows, and termination of executing resources may be controlled by interacting with a remote desktop environment that integrates the display of the remote resources and of the local resources. In yet another of these embodiments, an application or other resource accessible via an integrated desktop environment—including those resources executed on the local computing device 102 and those executed on the remote computing device 106—is shown in a single desktop environment.

In one embodiment, data objects from a remote computing device 106 are integrated into a desktop environment generated by the local computing device 102. In another embodiment, the remote computing device 106 maintains the integrated desktop. In still another embodiment, the local computing device 102 maintains the integrated desktop.

In some embodiments, a single remote desktop environment 204 is displayed. In one of these embodiments, the remote desktop environment 204 is displayed as a full-screen desktop. In other embodiments, a plurality of remote desktop environments 204 is displayed. In one of these embodiments, one or more of the remote desktop environments are displayed in non-full-screen mode on one or more display devices 124. In another of these embodiments, the remote desktop environments are displayed in full-screen mode on individual display devices. In still another of these embodiments, one or more of the remote desktop environments are displayed in full-screen mode on one or more display devices 124.

B. Systems Including Virtualization Environments

Figure 2A:
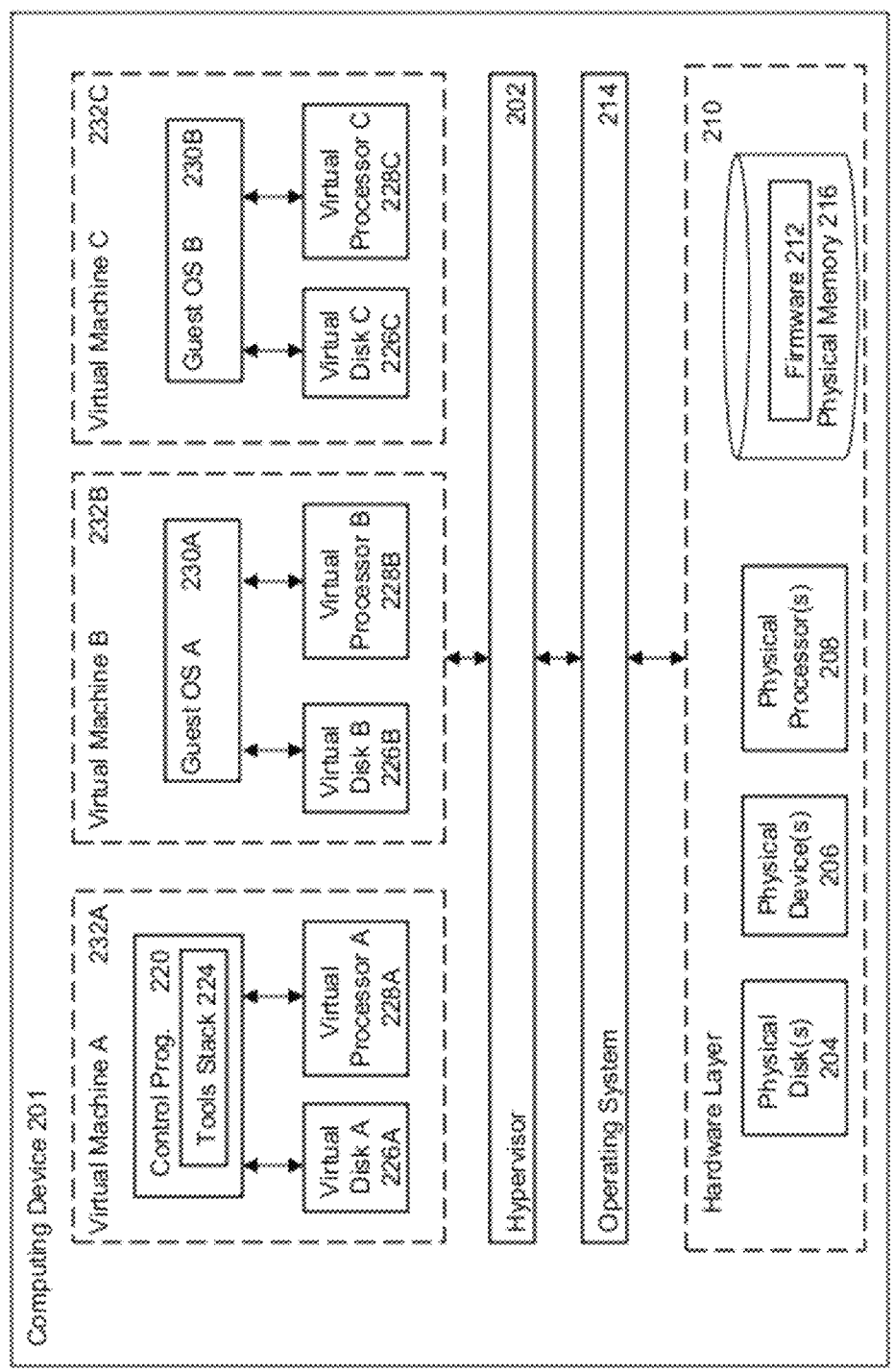
FIGS. 2A and 2B are block diagrams depicting embodiments of a virtualization environment.

Illustrated in FIG. 2A is one embodiment of a virtualization environment. Included on a computing device 201 is a hardware layer that can include one or more physical disks 204, one or more physical devices 206, one or more physical processors 208 and a physical memory 216. In some embodiments, firmware 212 can be stored within a memory element in the physical memory 216 and can be executed by one or more of the physical processors 208. The computing device 201 can further include an operating system 214 that can be stored in a memory element in the physical memory 216 and executed by one or more of the physical processors 208. Still further, a hypervisor 202 can be stored in a memory element in the physical memory 216 and can be executed by one or more of the physical processors 208. Executing on one or more of the physical processors 208 can be one or more virtual machines 232A-C (generally 232). Each virtual machine 232 can have a virtual disk 226A-C and a virtual processor 228A-C. In some embodiments, a first virtual machine 232A can execute, on a virtual processor 228A, a control program 220 that includes a tools stack 224. In other embodiments, one or more virtual machines 232B-C can executed, on a virtual processor 228B-C, a guest operating system 230A-B.

Further referring to FIG. 2A, and in more detail, in one embodiment the virtualization environment described includes a Type 2 hypervisor 202, or a hypervisor that executes within an operating system 214 executing on the computing device 201. A Type 2 hypervisor, in some embodiments, executes within an operating system 214 environment and virtual machines execute at a level above the hypervisor. In many embodiments, the Type 2 hypervisor executes within the context of a user's operating system such that the Type 2 hypervisor interacts with the user's operating system.

In some embodiments, the virtualization environment includes a computing device 201. The computing device 201 can be any computing device, and in some embodiments the computing device 201 can be any computer, device or computing machine described herein. While FIG. 2A illustrates a single computing device 201, in some embodiments the modules, programs, virtual machines, and commands stored and executed by the computing device 201 can be executed by more than one computing device 201. In still other embodiments, the computing device 201 can be a server farm.

In one embodiment, the computing device 201 can include a hardware layer 210 that includes one or more pieces of hardware that communicates with the computing machine 201. In some embodiments, the hardware layer 210 can include any hardware included in the computing device 201. In other embodiments, the hardware layer 210 can include one or more physical disks 204, one or more physical devices 206, one or more physical processors 208 and memory 216.

The hardware layer 210, in some embodiments, can include one or more physical disks 204. A physical disk 204 can be any hard disk, while in some embodiments a physical disk 204 can be any hard disk described herein. In some embodiments, the hardware layer 210 can include one physical disk 204. In other embodiments, the hardware layer 210 can include more than one physical disk 204. The computing device 201, in some embodiments, can communicate with an external hard disk that is included in the hardware layer 210 as a physical disk 204.

In other embodiments, the hardware layer 210 can include a processor 208. The processor 208, in some embodiments, can be any processor, while in other embodiments the processor 208 can be any processor described herein. The processor 208 can include one or more processing cores. In other embodiments the computing device 201 can include one or more processors 208. In some embodiments, the computing device 201 can include one or more different processors, e.g. a processing unit, a graphics processing unit, or a physics engine.

Physical devices 206, in some embodiments, can be any device included in the computing device 201. In some embodiments, physical devices 206 can be any combination of devices included in the computing device 201 and external devices that communicate with the computing device 201. The computing device 201, in some embodiments, can include one or more physical devices 206. A physical device 206 can be any of the following: a network interface card; a video card; a keyboard; a mouse; an input device; a monitor; a display device; speakers; an optical drive; a storage device; a universal serial bus connection; any device connected to the computing device 201; any device communicating with the computing device 201; a printer; a scanner; or any other device or device described herein. In various other figures provided herein, a physical device 206 may be shown external to computing device 201, for clarity and without limitation or implication of distinction between internal and external devices.

The hardware layer 210 can further include physical memory 216 that can include any type of memory. In some embodiments, the physical memory 216 can include any memory type described herein. The physical memory 216 can store data, and in some embodiments can store one or more programs, or set of executable instructions. FIG. 2A illustrates one embodiment where firmware 212 is stored within the physical memory 216 of the computing device 201. Programs or executable instructions stored in the physical memory 216 can be executed by the one or more processors 208 of the computing device 201.

Firmware 212, in some embodiments, can be any combination of executable instructions and hardware that controls hardware communicating with or included within the computing device 201. In some embodiments, the firmware 212 can control one or more pieces of hardware within the hardware layer 210. Firmware 212, in many embodiments, can be executed by one or more processors 208 within the computing device 201. In some embodiments, the firmware 212 can be boot firmware such as the basic input/output system (BIOS.) Additional firmware 212 executing on the computing device 201 can interface with the BIOS.

In one embodiment, the computing device 201 can include an operating system 214 executed by one or more physical processors 208. In some embodiments, the operating system 214 is a user operating system that can directly access the hardware devices in the hardware layer 210. The operating system 214 can be any operating system and in some embodiments, the operating system 214 can be any operating system described herein. FIG. 2A illustrates one embodiment where the hypervisor 202 executes within the context of the operating system 214 executing on the computing device 201. In this embodiment, the operating system 214 can be referred to as a host operating system 214, while the other operating systems can be referred to as guest operating systems. Guest operating systems can include the guest operating systems 230A-B executing on the virtual machines 232, and/or the control program 220.

In some embodiments, the computing device 201 can include a hypervisor 202. A hypervisor 202, in some embodiments, can be a program that executed by processors 208 on the computing device 201 to manage any number of virtual machines. The hypervisor 202 can be referred to as a virtual machine monitor, or platform virtualization software. In some embodiments, a hypervisor 202 can be any combination of executable instructions and hardware that monitors virtual machines executing on a computing machine. While FIG. 2A illustrates a virtualization environment that includes a Type 2 hypervisor 202, the computing device 201 can execute any other type of hypervisor. For example, the computing device 201 can execute a virtualization environment that includes a Type 1 hypervisor 202. In some embodiments, the computing device 201 can execute one or more hypervisors 202. These one or more hypervisors 202 can be the same type of hypervisor, or in other embodiments can be different hypervisor types.

The hypervisor 202, in some embodiments, can provide virtual resources to operating systems 230 or control programs 220 executing on virtual machines 232 in any manner that simulates the operating systems 230 or control programs 220 having direct access to system resources. System resources can include: physical devices; physical disks; physical processors; physical memory 216 and any other component included in the computing device 201 hardware layer 210. In these embodiments, the hypervisor 202 may be used to emulate virtual hardware, partition physical hardware, virtualize physical hardware, or execute virtual machines that provide access to computing environments. In still other embodiments, the hypervisor 202 controls processor scheduling and memory partitioning for a virtual machine 232 executing on the computing device 201. Hypervisor 202 may include those manufactured by VMWare, Inc., of Palo Alto, Calif.; the XEN hypervisor, an open source product whose development is overseen by the open source Xen.org community; HyperV, VirtualServer or virtual PC hypervisors provided by Microsoft, or others. In some embodiments, a computing device 201 executes a hypervisor 202 that creates a virtual machine platform on which guest operating systems may execute. In these embodiments, the computing device 201 can be referred to as a host server. An example of such a computing device is the XEN SERVER provided by Citrix Systems, Inc., of Fort Lauderdale, Fla.

In one embodiment, the hypervisor 202 can create a virtual machine 232A-B (generally 232) in which an operating system 230 executes. In one of these embodiments, for example, the hypervisor 202 loads a virtual machine image to create a virtual machine 232. In another of these embodiments, the hypervisor 202 executes an operating system 230 within the virtual machine 232. In still another of these embodiments, the virtual machine 232 executes an operating system 230.

In one embodiment, the hypervisor 202 controls the execution of at least one virtual machine 232. In another embodiment, the hypervisor 202 presents at least one virtual machine 232 with an abstraction of at least one hardware resource provided by the computing device 201. The abstraction can further be referred to as a virtualization or virtual view of the hardware, memory processor and other system resources available on the computing device 201. Hardware or hardware resources, in some embodiments, can be any hardware resource available within the hardware layer 210. In other embodiments, the hypervisor 202 controls the manner in which virtual machines 232 access the physical processors 208 available in the computing device 201. Controlling access to the physical processors 208 can include determining whether a virtual machine 232 should have access to a processor 208, and how physical processor capabilities are presented to the virtual machine 232.

In some embodiments, the computing device 201 can host or execute one or more virtual machines 232. A virtual machine 232 can be called a domain, a guest and/or a DOMAIN U or domU. A virtual machine 232 is a set of executable instructions that, when executed by a processor 208, imitate the operation of a physical computer such that the virtual machine 232 can execute programs and processes much like a physical computing device. While FIG. 2A illustrates an embodiment where a computing device 201 hosts three virtual machines 232, in other embodiments the computing device 201 can host any number of virtual machines 232. The hypervisor 202, in some embodiments, provides each virtual machine 232 with a unique virtual view of the physical hardware, memory, processor and other system resources available to that virtual machine 232. In some embodiments, the unique virtual view can be based on any of the following: virtual machine permissions; application of a policy engine to one or more virtual machine identifiers; the user accessing a virtual machine; the applications executing on a virtual machine; networks accessed by a virtual machine; or any other similar criteria. The hypervisor 202, in other embodiments, provides each virtual machine 232 with a substantially similar virtual view of the physical hardware, memory, processor and other system resources available to the virtual machines 232.

Each virtual machine 232 can include a virtual disk 226A-C (generally 226) and a virtual processor 228A-C (generally 228.) The virtual disk 226, in some embodiments, is a virtualized view of one or more physical disks 204 of the computing device 201, or a portion of one or more physical disks 204 of the computing device 201. The virtualized view of the physical disks 204 can be generated, provided and managed by the hypervisor 202. In some embodiments, the hypervisor 202 provides each virtual machine 232 with a unique view of the physical disks 204. Thus, in these embodiments, the virtual disk 226 included in each virtual machine 232 can be unique when compared with the other virtual disks 226.

A virtual processor 228 can be a virtualized view of one or more physical processors 208 of the computing device 201. In some embodiments, the virtualized view of the physical processors 208 can be generated, provided and managed by the hypervisor 202. In some embodiments, the virtual processor 228 has substantially all of the same characteristics of at least one physical processor 208. In other embodiments, the virtual processor 208 provides a modified view of the physical processors 208 such that at least some of the characteristics of the virtual processor 228 are different than the characteristics of the corresponding physical processor 208.

A control program 220 may execute at least one application for managing and configuring the guest operating systems executing on the virtual machines 232 and in some embodiments the computing device 201. In some embodiments, the control program 220 can be called a control operating system, a control domain, domain 0 or dom0. The control program 220, in some embodiments, can be DOMAIN 0 or DOM0 of the XEN hypervisor. Thus, in some embodiments, control program 220 may be executed within a control virtual machine or dom0 virtual machine, may be executed by the hypervisor, or may be executed by an operating system executing the hypervisor. The control program 220 can execute an administrative application or program that can further display a user interface which administrators can use to access the functionality of each virtual machine 232 and/or to manage the virtual machines 232. In some embodiments, the user interface generated by the administrative program can be used to terminate the execution of virtual machines 232, allocate resources to virtual machines 232, assign permissions to virtual machines 232, or manage security credentials associated with virtual machines 232. The control program 220, in some embodiments, can start new virtual machines 232 or terminate execution of executing virtual machines 232. In other embodiments, the control program 220 can directly access hardware and/or resources within the hardware layer 210. In still another embodiment, the control program 220 can interface with programs and applications executing on the computing device 210 and outside of the context of a virtual machine 232. Similarly, the control program 220 can interface with programs and applications executing within the context of a virtual machine 232.

In one embodiment, the hypervisor 202 can execute the control program 220 within a virtual machine 232. The hypervisor 202 can create and start the virtual machine 232. In embodiments where the hypervisor 202 executes the control program 220 within a virtual machine 232, that virtual machine 232 can be referred to as the control virtual machine 232. In still another embodiment, the control program 220 executes within a virtual machine 232 that is authorized to directly access physical resources on the computing device 201.

In some embodiments, a control program 220A (Not Shown) on a first computing device 201A (Not Shown) may exchange data with a control program 220B (Not Shown) on a second computing device 201B (Not Shown). In these embodiments the first computing device 201A may be located remote from the second computing device 201B. The control programs 220A-B can exchange data via a communication link between a hypervisor 202A (Not Shown) executing on the first computing device 201A and a hypervisor 202B (Not Shown) executing on the second computing device 201B. Through this communication link, the computing devices 201A-B can exchange data regarding processors and other physical resources available in a pool of resources. Further, through this connection between hypervisors 202A-B, the hypervisors 202A-B can manage a pool of resources, e.g. the resources available on the first computing device 201A and the second computing device 201B, distributed across one or more computing devices 201A-B. The hypervisors 202A-B can further virtualize these resources and make them available to virtual machines 232 executing on the computing devices 201A-B. In another instance of this embodiment, a single hypervisor 202 can manage and control virtual machines 232 executing on both computing devices 201A-B.

In some embodiments, the control program 220 interacts with one or more guest operating systems 230A-B (generally 230.) The control program 220 can communicate with the guest operating systems 230 through a hypervisor 202. Through the hypervisor 202, the guest operating system 230 can request access to physical disks 204, physical processors 208, memory 216, physical devices 206 and any other component in the hardware layer 210. In still other embodiments, the guest operating systems 230 can communicate with the control program 220 via a communication channel established by the hypervisor 202, such as, for example, via a plurality of shared memory pages made available by the hypervisor 202.

In some embodiments, the control program 220 includes a network back-end driver for communicating directly with networking hardware provided by the computing device 201. In one of these embodiments, the network back-end driver processes at least one virtual machine request from at least one guest operating system 230. In other embodiments, the control program 220 includes a block back-end driver for communicating with a storage element on the computing device 201. In one of these embodiments, the block back-end driver reads and writes data from the storage element based upon at least one request received from a guest operating system 230.

In another embodiment, the control program 220 includes a tools stack 224. In another embodiment, a tools stack 224 provides functionality for interacting with the hypervisor 202, communicating with other control programs 220 (for example, on a second computing device 201B), or managing virtual machines 232 on the computing device 201. In another embodiment, the tools stack 224 includes customized applications for providing improved management functionality to an administrator of a virtual machine farm. In some embodiments, at least one of the tools stack 224 and the control program 220 include a management API that provides an interface for remotely configuring and controlling virtual machines 232 running on a computing device 201. In other embodiments, the control program 220 communicates with the hypervisor 202 through the tools stack 224.

In one embodiment, the hypervisor 202 executes a guest operating system 230 within a virtual machine 232 created by the hypervisor 202. In another embodiment, the guest operating system 230 provides a user of the computing device 201 with access to resources within a computing environment. In still another embodiment, a resource includes a program, an application, a document, a file, a plurality of applications, a plurality of files, an executable program file, a desktop environment, a computing environment, or other resource made available to a user of the computing device 201. In yet another embodiment, the resource may be delivered to the computing device 201 via a plurality of access methods including, but not limited to, conventional installation directly on the computing device 201, delivery to the computing device 201 via a method for application streaming, delivery to the computing device 201 of output data generated by an execution of the resource on a second computing device 201' and communicated to the computing device 201 via a presentation layer protocol, delivery to the computing device 201 of output data generated by an execution of the resource via a virtual machine executing on a second computing device 201', or execution from a removable storage device connected to the computing device 201, such as a USB device, or via a virtual machine executing on the computing device 201 and generating output data. In some embodiments, the computing device 201 transmits output data generated by the execution of the resource to another computing device 201'.

In one embodiment, the guest operating system 230, in conjunction with the virtual machine on which it executes, forms a fully-virtualized virtual machine that is not aware that it is a virtual machine; such a machine may be referred to as a "Domain U HVM (Hardware Virtual Machine) virtual machine". In another embodiment, a fully-virtualized machine includes software emulating a Basic Input/Output System (BIOS) in order to execute an operating system within the fully-virtualized machine. In still another embodiment, a fully-virtualized machine may include a driver that provides functionality by communicating with the hypervisor 202. In such an embodiment, the driver is typically aware that it executes within a virtualized environment.

In another embodiment, the guest operating system 230, in conjunction with the virtual machine on which it executes, forms a paravirtualized virtual machine, which is aware that it is a virtual machine; such a machine may be referred to as a "Domain U PV virtual machine". In another embodiment, a paravirtualized machine includes additional drivers that a fully-virtualized machine does not include. In still another embodiment, the paravirtualized machine includes the network back-end driver and the block back-end driver included in a control program 220, as described above.

Figure 2B:
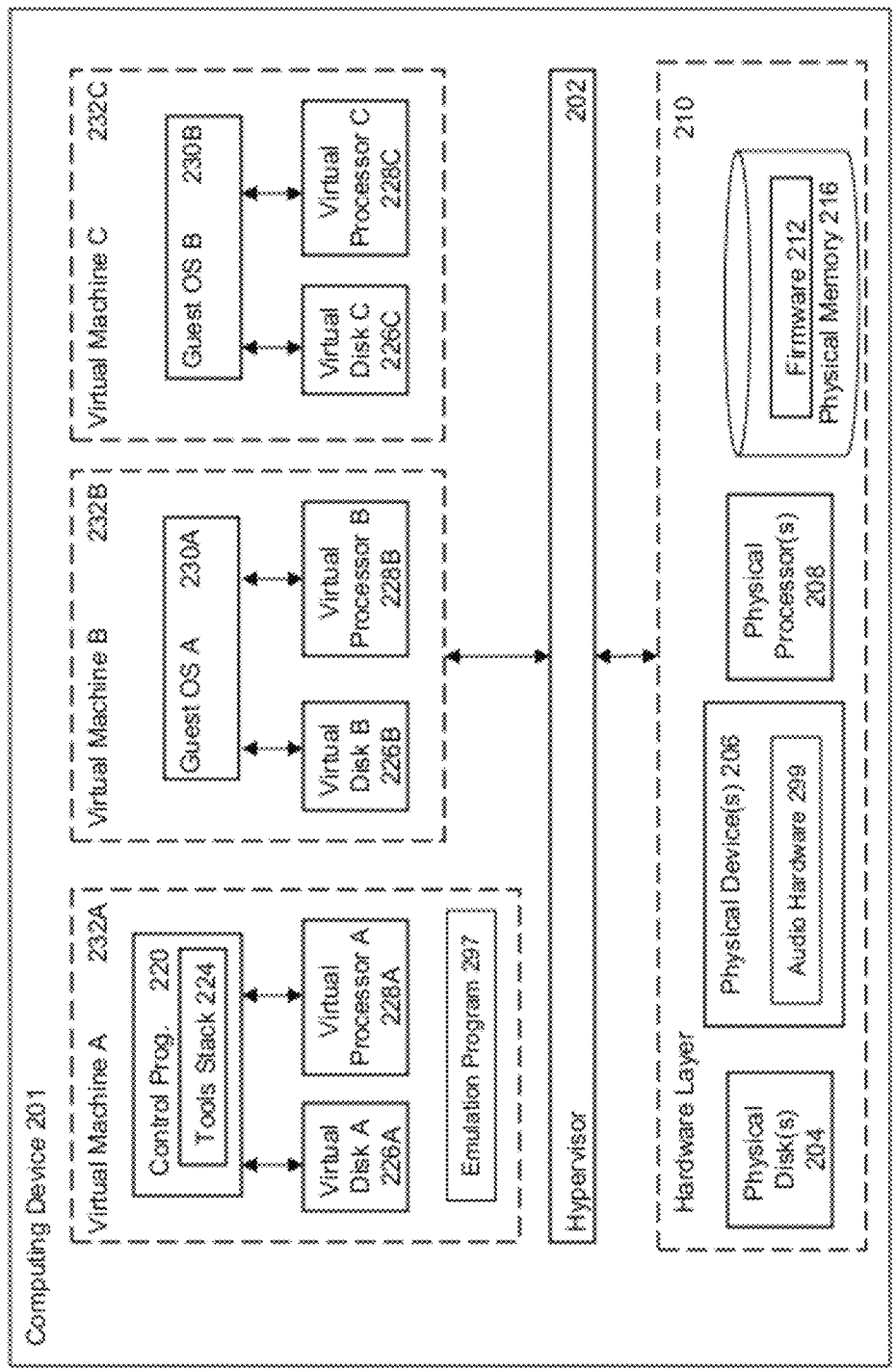

Illustrated in FIG. 2B is another embodiment of a virtualization environment that illustrates a Type 1 hypervisor 202. Executing on the computing device 201 is a hypervisor 202 that can directly access the hardware and resources within the hardware layer 210. Virtual machines 232 managed by the hypervisor 202 can be a non-trusted virtual machine 232B and/or a trusted virtual machine 232C. Whereas the virtualization environment depicted in FIG. 2A illustrates a host operating system 214, the virtualization environment embodiment in FIG. 2B does not execute a host operating system.

Further referring to FIG. 2B, and in more detail, the virtualization environment includes a Type 1 hypervisor 202. Type 1 hypervisors 202, in some embodiments, execute on "bare metal," such that the hypervisor 202 has direct access to all applications and processes executing on the computing device 201, all resources on the computing device 201 and all hardware on the computing device 201 or communicating with the computing device 201. While a Type 2 hypervisor 202 accesses system resources through a host operating system 214, a Type 1 hypervisor 202 can directly access all system resources. The Type 1 hypervisor 202 can execute directly on one or more physical processors of the computing device 201, and can include program data stored in the physical memory 216.

In a virtualization environment that employs a Type 1 hypervisor 202 configuration, the host operating system can be executed by one or more virtual machines 232. Thus, a user of the computing device 201 can designate one or more virtual machines 232 as the user's personal machine. This virtual machine can imitate the host operating system by allowing a user to interact with the computing device 201 in substantially the same manner that the user would interact with the computing device 201 via a host operating system 214.

Communication between virtual machines may, in some embodiments, be referred to as virtual-to-virtual or V2V technology. This mechanism may provide systems for inter-domain communication between domains running under a hypervisor. In one embodiment, the mechanism includes providing an API (Application Programmers Interface) that can be used in both kernel and user modes. The API can be present in any operating system running as a domain under the hypervisor, including Windows and Linux, or any other operating system. In one embodiment, the V2V API allows two domains or virtual machines to establish a channel of communication. In brief overview, one end of the channel starts as a listening endpoint. The other end can then connect to the listening endpoint. Once the channel is established, the two domains can send messages back and forth on the channel. When either end is finished communicating, it can disconnect the channel and free the associated resources.

In some embodiments, the message passing part of the API can be a low level program that permits any block of data to be sent and received. In some embodiments, V2V provides no transport layer semantics or higher layer functionalities. Thus, in many embodiments and unlike using network interfaces for communicating between virtual machines, messages may not need not be encapsulated with addresses or other headers. In other embodiments, other protocols can be built on top of the V2V API to provide higher level services.

In some embodiments, underlying event channel and shared memory architecture can be used between front end and back end para-virtual driver pairs. V2V, in some embodiments, establishes an API over these driver pairs to make them generic and reusable. V2V may be unique in that it provides a means of communication between domains that is based on the underlying hypervisor functionality. In particular, V2V can use the CITRIX Xen facilities to share memory pages or buffers between domains and the functionality to allow domains to send events to other domains via interrupts.

V2V usage, security and access control can be controlled by components in the control program, or the control program tool stack, discussed above. These systems and methods may be used for communications between two virtual machines, a dom0 or control virtual machine and a domU virtual machine, or any other combination of virtual machines.

C. Systems and Methods for Virtualizing Audio Hardware for Virtual Machines

In an organization such as a corporation, a user may have access to one or more machines for accessing the organization's resources. Some of these machines may execute one or more hypervisors that can manage virtual machines for executing company applications and accessing company resources. With the proliferation of cloud computing and virtualization, a user may have access to one or more virtual machines hosted on a client machine (e.g., assigned to the user), or on a remote server machine (e.g., accessed by one or more users). In some embodiments, a user may simultaneously use one virtual machine for playback of personal music files, while using a secure virtual machine for accessing corporate resources such as an email application. A user may also maintain two workspaces on the user's laptop computer, each workspace on a virtual desktop executing on the laptop computer. Accordingly, the allocation of hardware resources of a host to multiple virtual machines (e.g., including virtual desktops) can be quite complex.

Referring again to FIGS. 2A and 2B, two embodiments of a computing device hosting virtual machines 232 are depicted. The hardware layer 210 may provide resources that can be allocated to and/or shared between several virtual machines. These include processors 206, disks 204, memory 216, and physical devices 206 such as graphics cards, ports and audio hardware. Some of these hardware resources may be virtualized and assigned in whole or in part to one or more virtual machines. A dom0 entity, such as a hypervisor or control virtual machine, can have direct access to the hardware of the computing device. Thus, assignment of hardware resources is typically performed a dom0 entity, and may be performed dynamically when a need arises, or when a virtual machine is first established.

In various embodiments, a hypervisor 202, a control virtual machine 232A or a control program 220 can monitor and/or manage virtual machines hosted on the hypervisor, as well as interactions between a user and the virtual machines. The hypervisor, a control virtual machine or a control program can, for example, intercept a request initiated from a user or program to determine which virtual machine has focus, i.e., is presently active or in use by a user, while other virtual machines are in the background. The hypervisor, control virtual machine and/or control program are sometimes referred to as Domain 0 or dom0 entities. The hypervisor may host the control virtual machine as well as one or more secure and/or unsecure virtual machines. The hypervisor or the control virtual machine may provide a control program, which may execute on a processor of a physical machine hosting the hypervisor. In some embodiments, the control program is a virtualized program executing on a virtual processor of the control virtual machine. By way of illustration and not intended to be limiting in any way, portions of the following discussion may generally reference the control virtual machine 232A as a representative dom0 entity performing various monitoring and management functions. However, one or more other dom0 entities may perform the same or similar function, alone or in combination with the control virtual machine 232A.

A control virtual machine may be configured to monitor or intercept any communication initiated by a user or program via another virtual machine. Such a communication may comprise, or be translated into one or more system calls, hypercalls, interrupts, or other messages. Some of these may be passed to the underlying hypervisor or hardware layer for processing. In some embodiments, virtual machines are configured to pass all or specific types of communications through the control virtual machine 232A or hypervisor, whereupon the control virtual machine 232A can intercept at least some of these communications. In certain embodiments, virtual machines are configured to send all or specific types of communications to the control virtual machine 232A. In yet other embodiments, the control virtual machine 232A detects or intercepts a communication from a virtual machine as, before or after the communication translates into hypercalls, system calls or interrupts, e.g., for processing by the hypervisor or hardware layer. A communication may be initiated as, or translated into a V2V communication described above in connection with section B.

In some embodiments, the control virtual machine includes an input manager. The input manager, in some embodiments, can determine which virtual machine is in focus when an input device is activated. When a particular virtual machine receives focus, a change focus event can be forwarded (e.g., by the input device, a driver, a hypervisor, or an operating system of the virtual machine) to the input manager so that the input manager knows substantially all the time whether a virtual machine window has focus. When an input device is actuated, the corresponding driver may issue an event notification, such as a system call or interrupt. The input manager can intercept the system call or interrupt, and may direct the system call or interrupt to the virtual machine in focus. If a user has a first application with a first window open in a first virtual machine, and a second application with a second window in a second virtual machine, one may expect only one window to have focus, to receive mouse and keyboard input, or be foremost in a z-order at any one time.

In some embodiments, a control virtual machine determines which virtual machine is in focus based on a user's most recent interaction(s) with a virtual machine. For a virtual machine in the background, applications may continue to execute, and events can still occur. For example, a WINDOWS MEDIA PLAYER application executing in a background virtual machine may continue to play a video with accompanying audio. A virtual machine in the background may receive an incoming email, a patch update, a system alert or other event as they routinely or naturally occur. Such situations illustrate that it may be advantageous to allow existing processes (e.g., including audio-related processes) to continue to operate in virtual machines, regardless of whether the corresponding virtual machines are in focus or in the background. This allows a user to switch focus and multi-task efficiently between virtual machines without significant degradation in user experience. However, it may be challenging to support such processes across multiple virtual machines and yet provide satisfactory user experience across multiple virtual machines.

The systems and methods described herein addresses some aspects of the above issues, by managing access to audio hardware 299 by one or more virtual machines. The systems and methods disclosed herein further recognizes that host resources, such as audio hardware, may be limited, and provides the ability to manage and allocate such resources efficiently to one or more virtual machines. In some aspects, the present systems and methods accord better audio processing to a first virtual machine, as compared to another virtual machine. The systems and methods described herein may further assign or re-allocate a limited resource (e.g., a sound card 299), in whole or in part, from one virtual machine to another virtual machine if required. In various embodiments disclosed herein, although a sound card 299 may be referenced by way of illustration, any type or form of audio hardware 299, including audio chip sets and USB audio cards, are contemplated.

Figure 3A:
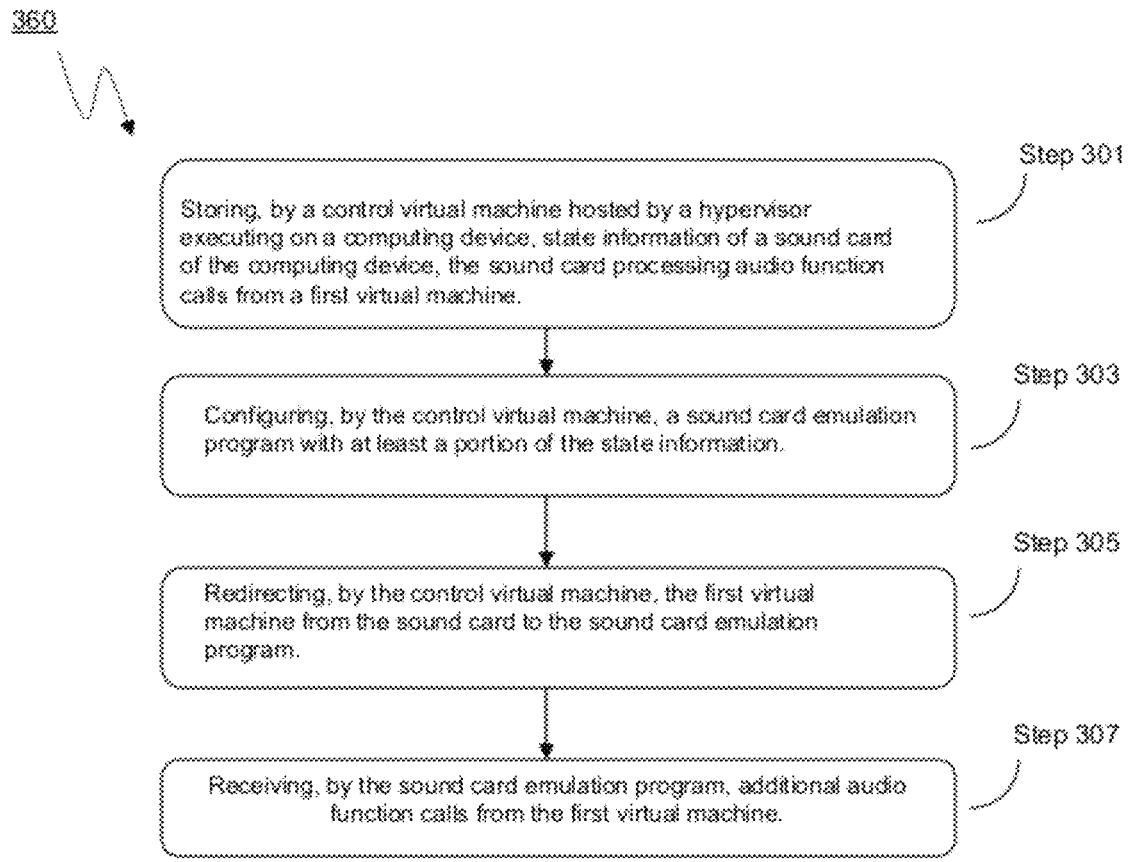
FIG. 3A is a flow diagram of an embodiment of a method for virtualizing or managing access to audio hardware for one or more virtual machines.

Illustrated in FIG. 3A is an embodiment of a method for virtualizing audio hardware for one or more virtual machines. A control virtual machine hosted by a hypervisor executing on a computing device may store state information of a sound card 299 of the computing device (Step 301). The sound card may be processing audio function calls from a first virtual machine. The control virtual machine may configure a sound card emulation program 297 with at least a portion of the state information (Step 303). The control virtual machine may redirect the first virtual machine from the sound card to the sound card emulation program (Step 305). The sound card emulation program may receive additional audio function calls from the first virtual machine (Step 307).

Further referring to FIG. 3A, and in more detail, a control virtual machine hosted by a hypervisor executing on a computing device may store state information of a sound card of the computing device (Step 301). The sound card may be processing audio function calls from a first virtual machine. An application in the first virtual machine, e.g., a RHAPSODY player or APPLE QUICKTIME player, may generate audio function calls. The application may transmit the function calls to a virtual driver executing on a guest operating system of the virtual machine. The virtual driver may modify the function calls and transmit the modified function calls to the hypervisor, control virtual machine, a virtual sound card of the virtual machine, or a virtual audio driver executing on the host OS of the computing device. In some embodiments, the control virtual machine intercepts the modified function calls. The control virtual machine, virtual sound card, virtual audio driver or hypervisor may direct the modified function calls to the sound card. The sound card may receive and process the modified function calls for audio or acoustic rendering at an output device.

In some embodiments, function calls may include event messages about pitch and intensity, control signals for parameters such as volume, vibrato and panning, cues, and/or clock signals to set the tempo. In some embodiments, audio function calls may include commands such as system calls and/or ioctl calls. These can include, for example, commands for open (e.g., to open a named audio device), close (e.g., to close an audio device), write (e.g., to write into audio buffer), audio stop, audio play, audio pause, audio set mute, audio select source, audio get status, etc. Function calls and audio information in various protocols (e.g., ASIO, MIDI, DAAP, etc) and/or platforms (e.g., MS WINDOWS, LINUX) are contemplated. In addition, function calls may include low level messages (e.g., system calls) as well as higher level representations of audio or sound (e.g., mp3, wav formats). In some embodiments, administrative function calls (e.g., write) may include a segment of audio data in the call, or may reference a segment of audio data.

In some embodiments, the control virtual machine may determine that a second virtual machine is requesting access or requires access to the sound card. For example, an audio application in the second virtual machine may begin to stream and/or buffer audio, such as high quality audio. The control virtual machine may determine that the second virtual machine is configured to support high definition audio. The control virtual machine may determine that the second virtual machine requires one or more audio processing features available in the sound card. The control virtual machine may determine that the second virtual machine is in the foreground. For example, the control virtual machine may determine that first virtual machine is in the background, or has been relegated to the background. The control virtual machine may determine that an application (e.g., an application that outputs audio data) or window of the second virtual machine has received focus. The control virtual machine may decide to assign the sound card to the second virtual machine in order to support high quality audio rendering. The control virtual machine may assign or allocate the sound card to the second virtual machine.

In some embodiments, the control virtual machine may determine that the second virtual machine is assigned a higher preference or priority over the first virtual machine for access to the sound card. The control virtual machine may determine that the first virtual machine has a priority to the sound card that is lower than that of the second virtual machine. The control virtual machine may determine that the first virtual machine is assigned a lower or the same priority to the sound card, e.g., relative to the second virtual machine. The control virtual machine may determine that the second virtual machine requires access to a feature in the sound card that the first virtual machine does not need or is not using. The control virtual machine may determine that there has been few or no audio functions calls from the first virtual machine over a period of time. The control virtual machine may determine that the second virtual machine presently has (and/or is expected to have) more need for the sound card audio hardware. In some cases, the control virtual machine may determine that the second virtual machine presently has focus, while the first virtual machine is in the background.

In certain embodiments, the control virtual machine may determine to re-allocate or re-assign the sound card from the first virtual machine to the second virtual machine. The control virtual machine may determine that the audio application in the second virtual machine is more critical or important than that in the first virtual machine. In certain embodiments, the control virtual machine may save or store state information associated with the sound card and/or the first virtual machine. For example, the control virtual machine may save an audio protocol stack, the state of one or more audio drivers (e.g., virtual drivers), audio function calls intercepted or queued for the sound card, sound card output to an output device and/or buffered audio content for processing by the sound card. The control virtual machine may save the state information in a buffer or memory, e.g., shared memory. The control virtual machine may save different components of the state information to various locations, such as cache, memory, disk storage, registers, etc. In some embodiments, the control virtual machine directs at least a portion of the state information to the virtual audio driver or a sound card emulation program.

The control virtual machine may configure a sound card emulation program 297 with at least a portion of the state information (Step 303). A sound card emulation program may provide features for emulating a hardware device such as a sound card. Thus, a guest operating system and its drivers running inside a virtual machine can have the illusion of accessing real hardware by communicating with a sound card emulation program. In some embodiments, a sound card emulation program comprises a virtual audio driver. A virtual audio driver may be a driver executing on the host OS of the client device. A virtual audio driver may sometimes be referred to as a paravirtual driver. The control virtual machine may configure a virtual audio driver or a virtual sound card with at least a portion of the state information. The virtual audio driver and/or a virtual sound card may interface or operate with the sound card emulation program 297. The virtual audio driver and/or a virtual sound card may comprise a sound card emulation program 297.

In some embodiments, the sound card emulation program comprises an application, program, code or instructions executing on the host OS. In some embodiments, the control virtual machine may comprise a sound card emulation program. The control virtual machine may identify, launch and/or execute a sound card emulation program responsive to saving the state information. The control virtual machine may instruct the sound card emulation program to retrieve the saved state information, e.g., from a buffer or a shared memory location.

In some embodiments, the sound card emulation program may incorporate or map to a portion of the sound card's audio stack. The sound card emulation program may use the state information to establish an audio stack. The sound card emulation program may use the state information to configure various emulation settings, such as universal asynchronous receiver/transmitter (UART) mode settings, Peripheral Interface Controller (PIC) settings, DOS Protected Mode Interface (DPMI) support and Musical Instrument Digital Interface (MIDI) mappings. The sound card emulation program may provide or execute audio drivers to handle various types of functions calls from the first virtual machine. The sound card emulation program may use the state information to configure its own settings, such as pitch and intensity, volume, vibrato and panning, cues, clock signals, bass/treble, etc. Some of these settings may be adjusted to match, conform, or be compatible with that of the sound card.

In some embodiments, the sound card emulation program may copy or transfer a portion of audio data and/or function calls buffered by the sound card. For example and in one embodiment, the control virtual machine may re-map an audio data buffer of the sound card to the sound card emulation program. The control virtual machine may instruct the sound card emulation program to access shared memory storing audio data and/or function calls.

The control virtual machine may redirect the first virtual machine from the sound card to the sound card emulation program (Step 305). The control virtual machine may identify or intercept audio functions calls from the first virtual machine, and may redirect these function calls to the sound card emulation program. For example and in one embodiment, the control virtual machine may switch a queue of audio function calls, from the sound card to the sound card emulation program. In some embodiments, the control virtual machine may reconfigure device mapping from the sound card to the sound card emulation program. For example, the control virtual machine may add the sound card emulation program as a "hardware" or virtual hardware in the first virtual machine. The control virtual machine may replace the mapping from the sound card to the sound card emulation program.

The control virtual machine may perform the redirection in a seamless or substantially seamless manner. The control virtual machine may redirect the first virtual machine from the sound card to the sound card emulation program without the first virtual machine detecting a removal of the sound card. For example, it may appear to the first virtual machine that the original audio hardware corresponding to the sound card had not been removed or changed. In some embodiments, the first virtual machine may detect a change in audio device or audio configuration but that there is continuity in audio processing or support. In some embodiments, the first guest OS of the first virtual machine does not issue an interrupt or an error during the redirection or transition. The control virtual machine may redirect the first virtual machine from the sound card to the sound card emulation program without triggering an interrupt or error from an OS of the first virtual machine. In some embodiments, the control virtual machine may (e.g., temporarily) disable or mask certain interrupts or errors that an OS of the first virtual machine may generate. The control virtual machine may replace the sound card with the sound card emulation program in a device mapping of the first virtual machine, hypervisor, control virtual machine and/or the computing device. The device mapping may include a table or other data structure indicating hardware resource or device assignments and/or allocations.

The control virtual machine may modify a destination of a function call destined for the sound card to identify the sound card emulation program instead. In certain embodiments, the control virtual machine may intercept audio communications from the first virtual machine to redirect to the sound card emulation program. The control virtual machine may intercept the additional audio function calls from the first virtual machine to redirect to the sound card emulation program. In some embodiments, the control virtual machine operates as a switch or conduit to channel communications from the first virtual machine to the sound card emulation program instead of to the sound card. The sound card emulation program may provide a driver to communicate with the first virtual machine, or to communicate with the control program on behalf of the first virtual machine. In some embodiments, the control virtual machine may use features from an Audio Stream Input/Output (ASIO) protocol or another suitable protocol to connect the first virtual machine to the sound card emulation program.

The sound card emulation program may receive additional audio function calls from the first virtual machine (Step 307). Responsive to the redirection, the sound card emulation program may receive additional audio function calls from the first virtual machine. The control virtual machine may continue to facilitate redirection of audio communications to the sound card emulation program, or may reconfigure the first virtual machine to direct audio communications to the sound card emulation program. In some embodiments, the sound card emulation program takes over processing of audio communications from the first virtual machine. In certain cases, a control virtual machine may transition the sound card back to the first virtual machine using some of the features described herein.

In some embodiments, the sound card emulation program may direct its audio output to a device other than the sound card. In some embodiments, the sound card emulation program may direct audio output to a buffer or a sound rendering hardware, e.g., a speaker. The sound card emulation program may be configured to bypass the sound card, e.g., and direct audio output to a speaker. In certain embodiments, the sound card emulation program receives incoming audio communications from the first virtual machine but may not process some or all of the incoming audio communications. The sound card emulation program may be configured to generate no audio output in some embodiments. For example and in one embodiment, the sound card emulation program may be configured to handle communications to and fro the first virtual machine and/or the control virtual machine, but does not support rendering of audio.

The sound card emulation program may be configured to provide continuity for audio processing in view of the sound card re-assignment, e.g., with the illusion that the first virtual machine still has access to the sound card. In some embodiments, audio output from the sound card emulation program is buffered or stored, but not forwarded to an output device (e.g., speaker). In some embodiments, the sound card may be re-assigned back to the first virtual machine using any of the method steps described above. The control virtual machine may redirect the first virtual machine, from the sound card emulation program, back to the sound card.

Figure 3B:
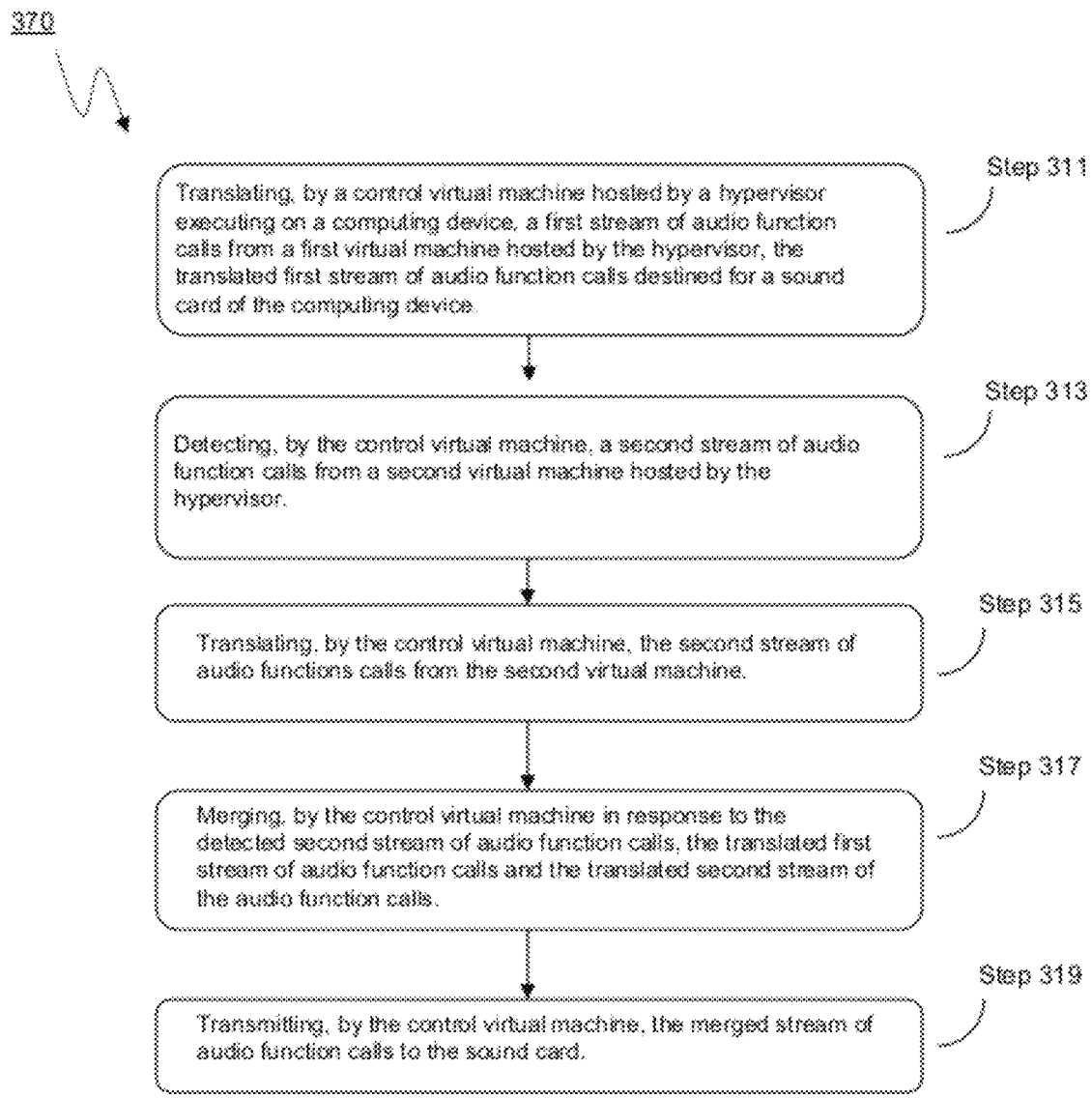
FIGS. 3B and 3C are flow diagrams of embodiments of methods for virtualizing audio hardware for one or more virtual machines.

Illustrated in FIG. 3B is another embodiment of a method for virtualizing audio hardware for one or more virtual machines. A control virtual machine hosted by a hypervisor executing on a computing device may translate a first stream of audio functions calls from a first virtual machine hosted by the hypervisor (Step 311). The translated first stream of audio function calls may be destined for a sound card of the computing device. The control virtual machine may detect a second stream of audio functions calls from a second virtual machine hosted by the hypervisor (Step 313). The control virtual machine may translate the second stream of audio functions calls from the second virtual machine (Step 315). The control virtual machine may merge, in response to the detected second stream of audio function calls, the translated first stream of audio function calls and the translated second stream of the audio function calls (Step 317). The control virtual machine may transmit the merged stream of audio function calls to the sound card (Step 319).

Further referring to FIG. 3B, and in more detail, a control virtual machine hosted by a hypervisor executing on a computing device may translate a first stream of audio functions calls from a first virtual machine hosted by the hypervisor (Step 311). The translated first stream of audio function calls may be destined for a sound card of the computing device. The control virtual machine may translate function calls from the first virtual machine to functions calls that a host-level entity can understand. A host-level entity can include a host operating system, an audio driver, audio hardware such as a sound card, and a sound card emulation program. In some embodiments, the translation includes modifying a destination of the function call to a particular host-level entity, e.g., as defined by a virtual-to-physical mapping table. The control virtual machine may translate function calls from a first protocol to a second protocol (e.g., ASIO). In some embodiments, the control virtual machine may translate low level event messages (e.g., for pitch and intensity, control signals for parameters such as volume, vibrato and panning) into higher level audio instructions or audio data.

The control virtual machine may detect a second stream of audio function calls from a second virtual machine hosted by the hypervisor (Step 313). The control virtual machine may intercept a second stream of audio function calls from a second virtual machine. In some embodiments, the control virtual machine may receive a notification of a second stream of audio function calls. The notification may be generated by the second virtual machine, an application of the second virtual machine, a driver of the virtual machine, a virtual audio driver of the host OS, a sound card, or a sound card emulation program. In some embodiments, the second stream of audio function calls may comprise a system alert, e.g., from the guest OS of the second virtual machine. The second stream of audio function calls may comprise an audio alert from an application, e.g., indicating receipt of an email by MICROSOFT OUTLOOK.

The control virtual machine may translate the second stream of audio function calls from the second virtual machine (Step 315). The translation may incorporate any of the methods and steps discussed above, such as in step 311. The control virtual machine may buffer one stream while translating a portion of the other stream. In some embodiments, the control virtual machine may perform the translation simultaneously between the two streams of function calls. The control virtual machine may establish a separate thread, process or driver for processing each stream of function call. In some embodiments, the control virtual machine may buffer a portion of the translated streams. The control virtual machine may, in certain embodiments, perform the translation on function calls from either streams in a first in first out (FIFO) fashion. As such, translation may be performed as functions calls are interleaved from the two streams and received or intercepted by the control virtual machine.

The control virtual machine may merge, in response to the detected second stream of audio function calls, the translated first stream of audio function calls and the translated second stream of the audio function calls (Step 317). In some embodiments, the control virtual machine may merge the translated functions calls from the two streams together, e.g., in a FIFO fashion. The control virtual machine may merge the translated first stream of audio function calls and the translated second stream of the audio function calls in a FIFO fashion. The control virtual machine may merge the translated functions calls from the separate translation threads, processes or drivers. The control virtual machine may merge the translated first stream of audio function calls and the translated second stream of the audio function calls. The control virtual machine may buffer the translated functions calls together prior to transmission to the next destination.

In some embodiments, the control virtual machine may perform audio mixing on higher level audio data included in the two streams. The control virtual machine may separate administrative calls (e.g., audio get status, audio get capability) from audio data that can be mixed or merged. The control virtual machine may feed event messages (e.g., MIDI messages) and/or audio data from the two virtual machines into a single stream. In some situations, a destination entity receiving translated function calls may be agnostic to the source of the function calls. For example, some event messages are indiscriminately processed by a destination entity regardless of their source. In such cases, the control virtual machine may merge these messages or function calls into a single stream for handling. The control virtual machine may merge the translated first stream of audio function calls and the translated second stream of the audio function calls.

In some embodiments, the control virtual machine may mix the two streams but still support polyphony. In certain situations or embodiments, the control virtual machine may mix the two streams into a mono output. The control virtual machine may remove certain source-specific and/or redundant information from the two streams. The control virtual machine may further combine certain function calls into fewer messages. For example, the control virtual machine may combine two or more of the audio function calls from the first and second streams into one audio function call. The control virtual machine may merge temporally-sensitive data from the two stream and present the output stream while maintaining temporal order when render as sounds. The control virtual machine may delay or advance at least one audio function call from the first or second stream, in the merged stream. In some cases, the control virtual machine may delay or advance certain functions calls to the destination. For example, higher priority function calls may be translated, processed and/or expedited to the destination. Low priority function calls may sometimes be delayed in the merged stream or dropped. In certain embodiments, the control virtual machine maintains, or substantially maintains the sequence of audio function calls received from the first or second stream, in the merged stream.

In some embodiments, the control virtual machine or an audio driver may detect different characteristics between two audio streams and may adjust each stream accordingly during mixing. For example, the control virtual machine may normalize settings (e.g., pitch, bass) between the two streams of audio data. In certain embodiments, the control virtual machine may accord one stream a higher priority or prominence, and may adjust the volume or audio quality settings of that stream prior to mixing. The control virtual machine may further accord a larger bandwidth to one stream prior to mixing into a single stream. Some data from the lower priority stream may be dropped to produce a lower quality audio component in the merged stream.

In some embodiments, the control virtual machine detects a third stream of audio function calls from a third virtual machine hosted by the hypervisor. The control virtual machine may translate the third stream of audio function calls from the third virtual machine. The control virtual machine may determine that the first stream of audio function calls has a higher priority than one or both of the second and third streams of audio function calls. The control virtual machine may merge the translated versions of the second and third streams of audio function calls into a fourth stream of audio function calls. The control virtual machine may merge the translated first stream of audio function calls with the fourth stream of audio function calls into a fifth stream of audio function calls. The detection, translation and/or merging may incorporate any of the features described above in connection with (311)-(317) and/or the features described in connection with FIG. 3C.

In certain embodiments, the control virtual machine may provide the translated first stream with at least or substantially the same bandwidth or processing quality as the fourth stream of audio function calls. In some embodiments, the control virtual machine sends the translated third stream of audio function calls to one of: an emulation program and a second sound card, to generate a first audio output. An audio driver may mix the first audio output and an audio output of the sound card, for audio rendering.

The control virtual machine may transmit the merged stream of audio function calls to the sound card (Step 319). The control virtual machine may forward the translated function calls in a single stream to a destination such as a sound card. The control virtual machine may buffer the merged stream for transmission to the destination. In some embodiments, control signals and/or exceptions may be handled separate from the merged stream. For example, these messages may be communicated via a control connection between the source (or the control virtual machine) and the destination.

Figure 3C:
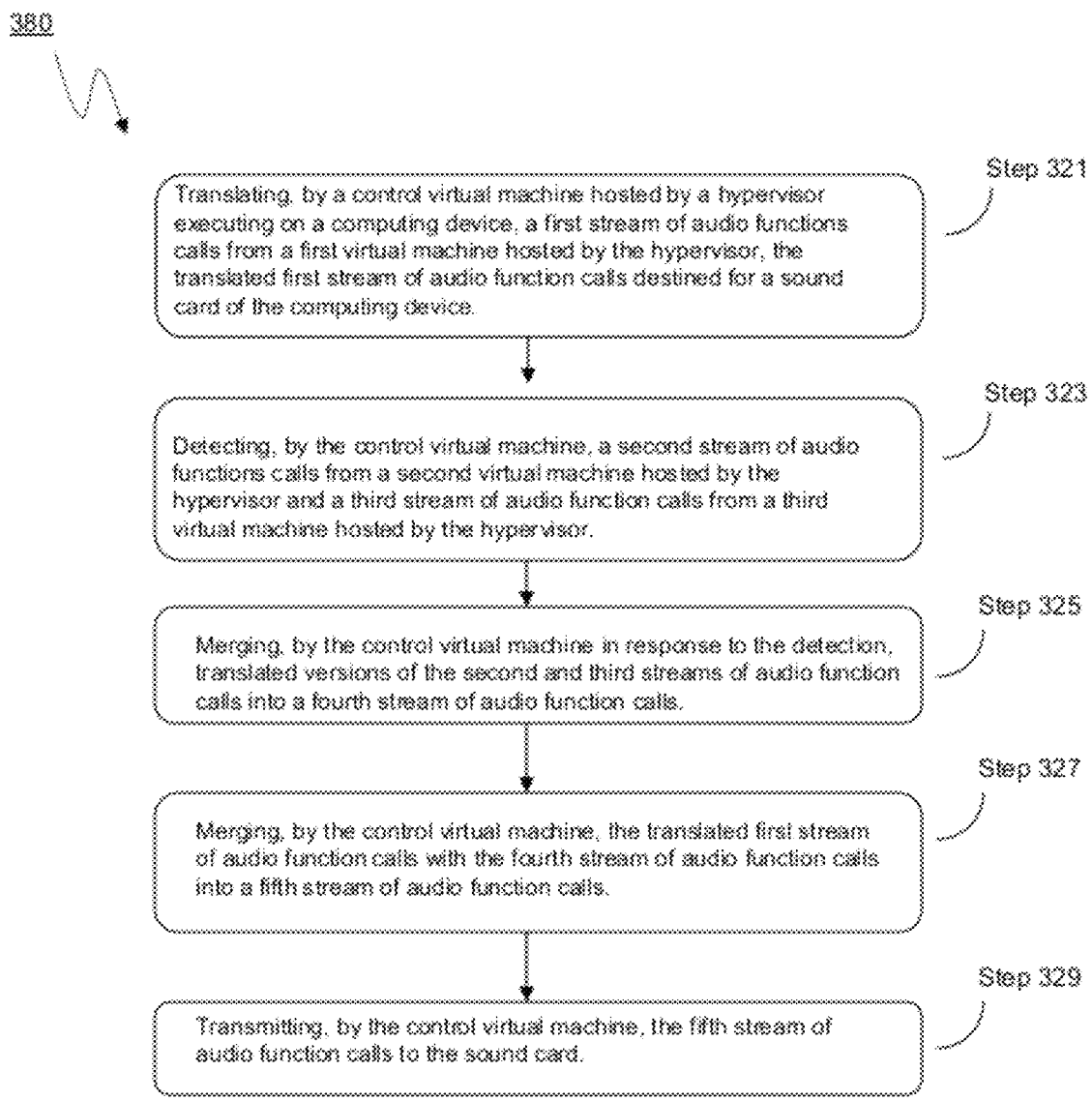

Illustrated in FIG. 3C is another embodiment of a method for virtualizing audio hardware for one or more virtual machines. A control virtual machine hosted by a hypervisor executing on a computing device may translate a first stream of audio function calls from a first virtual machine hosted by the hypervisor (Step 321). The translated first stream of audio function calls may be destined for a sound card of the computing device. The control virtual machine may detect a second stream of audio function calls from a second virtual machine hosted by the hypervisor and a third stream of audio function calls from a third virtual machine hosted by the hypervisor (Step 323). The control virtual machine may merge, in response to the detection, translated versions of the second and third streams of audio function calls into a fourth stream of audio function calls (Step 325). The control virtual machine may merge the translated first streams of audio function calls with the fourth stream of audio function calls into a fifth stream of audio function calls (Step 327). The control virtual machine may transmit the fifth stream of audio function calls to the sound card (Step 329).

Further referring to FIG. 3C, and in more detail, a control virtual machine hosted by a hypervisor executing on a computing device may translate a first stream of audio functions calls from a first virtual machine hosted by the hypervisor (Step 321). The translated first stream of audio function calls may be destined for a sound card of the computing device. This step may incorporate various embodiments of the steps and methods discussed above, such as those described in step 311.

The control virtual machine may detect a second stream of audio function calls from a second virtual machine hosted by the hypervisor and a third stream of audio functions calls from a third virtual machine hosted by the hypervisor (Step 323). This step may incorporate various embodiments of the steps and methods discussed above, such as those described in step 313. The control virtual machine may detect the third and fourth streams via different methods and/or at different points in time.

The control virtual machine may merge, in response to the detection, translated versions of the second and third streams of audio function calls into a fourth stream of audio function calls. (Step 325). This step may incorporate various embodiments of the steps and methods discussed above, such as those described in step 317. In some embodiments, the control virtual machine may employ or execute a sound card emulator, virtual audio driver and/or any other entity to perform the merging. The control virtual machine may employ or execute a sound card emulator to process the merged (fourth) stream of audio function calls. In certain situations, the control virtual machine may determine that the first stream has higher priority and/or should have higher audio or processing prominence over the second stream and/or the third stream. The control virtual machine may perform the translation, merging and/or mixing of the second and third streams to produce a lower priority or lower quality audio stream. In comparison, the control virtual machine may translate of the first stream to produce a higher quality audio stream, e.g., because the first stream originates from a virtual machine that has higher priority or has focus.

The control virtual machine may merge the translated first streams of audio function calls with the fourth stream of audio function calls into a fifth stream of audio function calls (Step 327). This step may incorporate various embodiments of the steps and methods discussed above, such as those described in steps 317 and/or 326. In some embodiments, the control virtual machine may accord the first translated stream with the same or substantially the same bandwidth and/or processing quality as and the fourth (merged) stream. In other embodiments, the control virtual machine may accord the first translated stream with higher bandwidth and/or better processing quality than the fourth stream. Thus, in some embodiments, the first stream may achieve greater prominence or better quality as a component in the merged (fifth) stream, compared with audio components attributed to the second, third and/or fourth streams. In certain embodiments, the merging process in this step may be of better quality than that employed in step 325, e.g., so that higher fidelity is maintained in the first stream's audio components.

The control virtual machine may transmit the fifth stream of audio function calls to the sound card (Step 329). This step may incorporate various embodiments of the steps and methods discussed above, such as those described in step 319.

In some embodiments, the fourth stream is processed by a sound card emulation program or a secondary audio device. This sound card emulation program or a secondary audio device may produce a first audio output. The control virtual machine may direct the translated first audio stream to the sound card (e.g., primary audio device) for processing. The output from the sound card may produce a second audio output. In some embodiments, the control virtual machine, or an audio driver, may merge or mix the first and second audio outputs together. The merging or mixing process may incorporate any of the principles, method and concepts discussed herein. The combined or merged audio output may be sent to an output device, such as a speaker, for audio rendering.

In some aspects, the present systems and method may effectively accord better processing and/or allocate more resources to a first audio stream from a first virtual machine, as compared to one or more audio streams originating from other virtual machines. For example, the systems and methods described can be employed to effectively and flexibly partition or virtualize an audio hardware to process audio streams from multiple virtual machines. The systems and methods described herein may further assign or allocate a limited resource (e.g., a sound card), in whole or in part, from one virtual machine to another virtual machine if required.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, floppy disk, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

Having described certain embodiments of methods and systems for virtualizing audio hardware for one or more virtual machines, it will now become apparent to one of skill in the art that other embodiments incorporating the concepts of the disclosure may be used.

What is claimed:

1. A method for virtualizing audio hardware for at least one virtual machine, the method comprising:
    receiving, by a control virtual machine hosted by a hypervisor executing on a computing device, a request from a first virtual machine for access to a sound card, the sound card processing audio function calls queued from a second virtual machine, wherein the first virtual machine and the second virtual machine each have respective queues for queuing associated audio function calls;
    determining, by the control virtual machine, that the first virtual machine requests access to the sound card and has a priority to the sound card higher than that of the second virtual machine;
    storing, by the control virtual machine, state information of the sound card of the computing device, the state information comprising one or more audio function calls from the second virtual machine queued for the sound card;
    configuring, by the control virtual machine, a sound card emulation program with at least a portion of the stored state information comprising the one or more audio function calls from the second virtual machine queued for the sound card;
    redirecting, by the control virtual machine, the second virtual machine from the sound card to the sound card emulation program; and
    receiving, by the sound card emulation program, additional audio function calls from the second virtual machine.

2. The method of claim 1, comprising assigning, by the control virtual machine, the sound card to a first virtual machine.

3. The method of claim 1, comprising configuring a virtual audio driver with the at least a portion of the state information.

4. The method of claim 1, comprising redirecting the second virtual machine from the sound card to the sound card emulation program without triggering an interrupt or error from an operating system of the second virtual machine.

5. The method of claim 1, comprising redirecting the second virtual machine from the sound card to the sound card emulation program without the second virtual machine detecting a removal of the sound card.

6. The method of claim 1, further comprising intercepting, by the control virtual machine, the additional audio function calls from the second virtual machine.

7. The method of claim 1, comprising replacing, by the control virtual machine, the sound card with the sound card emulation program in a device mapping of the second virtual machine.

8. The method of claim 1, comprising redirecting, by the control virtual machine, the second virtual machine from the sound card emulation program to the sound card.

9. A method for virtualizing audio hardware for at least one virtual machine, the method comprising:
    translating, by a control virtual machine hosted by a hypervisor executing on a computing device, a first stream of audio function calls from a first virtual machine hosted by the hypervisor, the translated first stream of audio function calls destined for a sound card of the computing device;
    detecting, by the control virtual machine, a second stream of audio function calls from a second virtual machine hosted by the hypervisor;
    translating, by the control virtual machine, the second stream of audio function calls from the second virtual machine;
    determining, by the control virtual machine, that the first virtual machine requests access to the sound card and has a priority to the sound card and a priority for the second virtual machine to the sound card;
    merging, by the control virtual machine in response to the detected second stream of audio function calls, the translated first stream of audio function calls and the translated second stream of the audio function calls;
    advancing or delaying at least one audio function call from the first steam responsive to the determined priority for the first virtual machine and the priority for the second virtual machine; and
    transmitting, by the control virtual machine, the merged stream of audio function calls to the sound card.

10. The method of claim 9, comprising merging the translated first stream of audio function calls and the translated second stream of the audio function calls in a first-in-first-out (FIFO) fashion.

11. The method of claim 9, comprising merging the translated first stream of audio function calls and the translated second stream of the audio function calls.

12. The method of claim 9, comprising combining two or more of the audio function calls from the first and second streams into one audio function call.

13. The method of claim 9, comprising detecting a third stream of audio function calls from a third virtual machine hosted by the hypervisor, and translating the third stream of audio function calls from the third virtual machine.

14. The method of claim 13, comprising determining that the first stream of audio function calls has a higher priority than one or both of the second and third streams of audio function calls.

15. The method of claim 13, comprising merging the translated versions of the second and third streams of audio function calls into a fourth stream of audio function calls, and merging the translated first stream of audio function calls with the fourth stream of audio function calls into a fifth stream of audio function calls.

16. The method of claim 15, further comprising providing the translated first stream with at least the same bandwidth or processing quality as the fourth stream of audio function calls.

17. The method of claim 13, further comprising sending the translated third stream of audio function calls to one of: an emulation program and a second sound card, to generate a first audio output.

18. The method of claim 17, further comprising mixing, by an audio driver, the first audio output and an audio output of the sound card, for audio rendering.

\* \* \* \* \*